United States Patent
Armbruster et al.

(10) Patent No.: US 11,333,485 B2
(45) Date of Patent: May 17, 2022

(54) ALIGNMENT METHOD FOR A BEAM-DIRECTING UNIT OF AN INTERFEROMETRIC MEASURING DEVICE, AND MEASURING DEVICE FOR CARRYING OUT AN INTERFEROMETRIC MEASUREMENT BY MEANS OF LASER RADIATION

(71) Applicant: Polytec GmbH, Waldbronn (DE)

(72) Inventors: Bernd Armbruster, Karlsruhe (DE); Matthias Schussler, Waldbronn (DE); Bernd Heinen, Karlsruhe (DE)

(73) Assignee: Polytec GmbH, Waldbronn (DE)

( * ) Notice: Subject to any disclaimer, the term of this patent is extended or adjusted under 35 U.S.C. 154(b) by 0 days.

(21) Appl. No.: 17/251,353

(22) PCT Filed: Jun. 5, 2019

(86) PCT No.: PCT/EP2019/064712
§ 371 (c)(1),
(2) Date: Dec. 11, 2020

(87) PCT Pub. No.: WO2019/238508
PCT Pub. Date: Dec. 19, 2019

(65) Prior Publication Data
US 2021/0278197 A1    Sep. 9, 2021

(30) Foreign Application Priority Data
Jun. 15, 2018    (DE) .................... 10 2018 114 480.6

(51) Int. Cl.
*G01B 9/02055*    (2022.01)
*G01S 17/894*    (2020.01)
(Continued)

(52) U.S. Cl.
CPC ...... *G01B 9/02068* (2013.01); *G01B 11/2441* (2013.01); *G01B 11/25* (2013.01); *G01H 9/00* (2013.01); *G01S 17/894* (2020.01)

(58) Field of Classification Search
CPC ............ G01B 9/02017; G01B 9/02019; G01B 9/02068; G01B 11/161; G01B 11/2441;
(Continued)

(56) References Cited

U.S. PATENT DOCUMENTS 6,711,293 B1    3/2004    Lowe
9,551,726 B2    1/2017    Schussler et al.
(Continued)

FOREIGN PATENT DOCUMENTS

DE    102012211549    7/2013
EP    2515073    10/2012
WO    9315386    8/1993

OTHER PUBLICATIONS https://en.wikipedia.org/wiki/Structure_from_motion, (admitted prior art) accessed Dec. 8, 2020.
(Continued)

*Primary Examiner* — Michael A Lyons
(74) *Attorney, Agent, or Firm* — Volpe Koenig

(57) ABSTRACT

An alignment method for a beam-directing unit of an interferometric measuring device for directing a laser beam of a laser beam source towards a plurality of measurement points of an object under measurement, wherein a three-dimensional model of a measurement surface of an object under measurement is created by a plurality of spatially resolved images. A measuring device for carrying out an interferometric measurement by laser radiation is also provided, having a controller which is designed to align a beam-directing unit of the measurement device.

16 Claims, 6 Drawing Sheets

(51) Int. Cl.
  *G01B 11/24* (2006.01)
  *G01B 11/25* (2006.01)
  *G01H 9/00* (2006.01)
(58) Field of Classification Search
  CPC .......... G01B 11/25; G01H 9/00; G01S 17/58; G01S 17/894
  See application file for complete search history.

(56) References Cited

U.S. PATENT DOCUMENTS

| | | | |
|---|---|---|---|
| 2014/0107958 A1 | 4/2014 | Hayashi | |
| 2014/0375794 A1* | 12/2014 | Singh | G01B 11/14 348/95 |
| 2015/0009493 A1* | 1/2015 | Kwiatkowski | G01S 17/42 356/139.06 |
| 2017/0199279 A1* | 7/2017 | Sebastian | G01S 17/34 |
| 2018/0216927 A1* | 8/2018 | Vyacheslav | G01M 7/025 |
| 2019/0145757 A1* | 5/2019 | Williams | G01B 9/02024 356/614 |

OTHER PUBLICATIONS

Yanchu, et al., An Identification Algorithm for Directing the Measurement Point of Scanning Laser Vibrometers, Optics and Lasers in Engineering, Amsterdam, Netherlands, vol. 22, No. 2, pp. 1-5-120, Jan. 1, 1995.

Marius Muja and David G. Lowe, "Fast Approximate Nearest Neighbors with Automatic Algorithm Configuration", in International Conference on Computer Vision Theory and Applications, 10 pages (VISAPP'09), 2009).

* cited by examiner

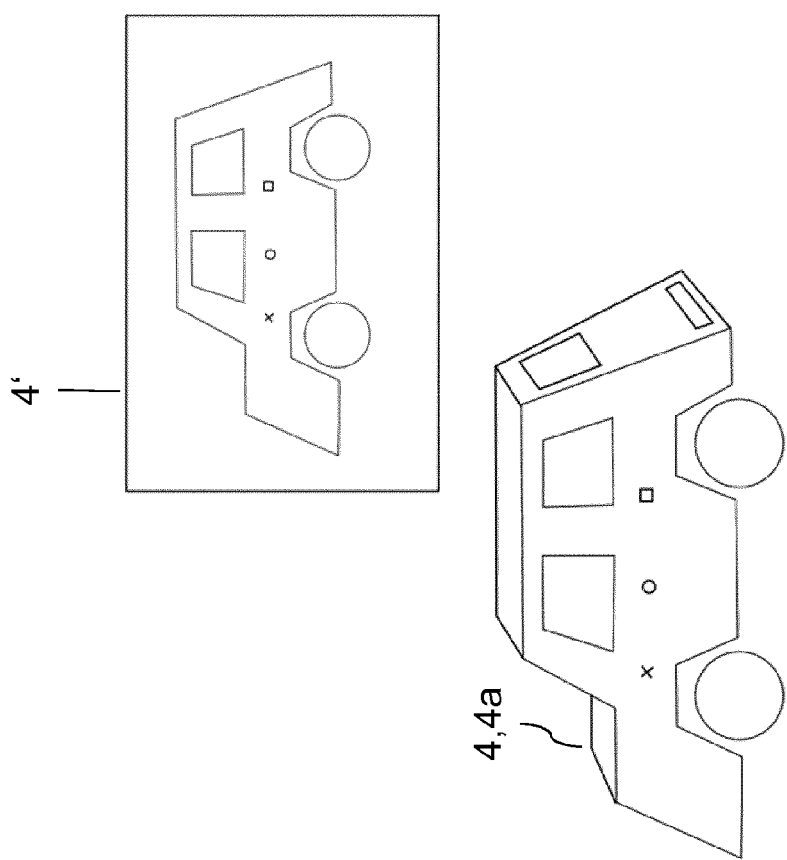

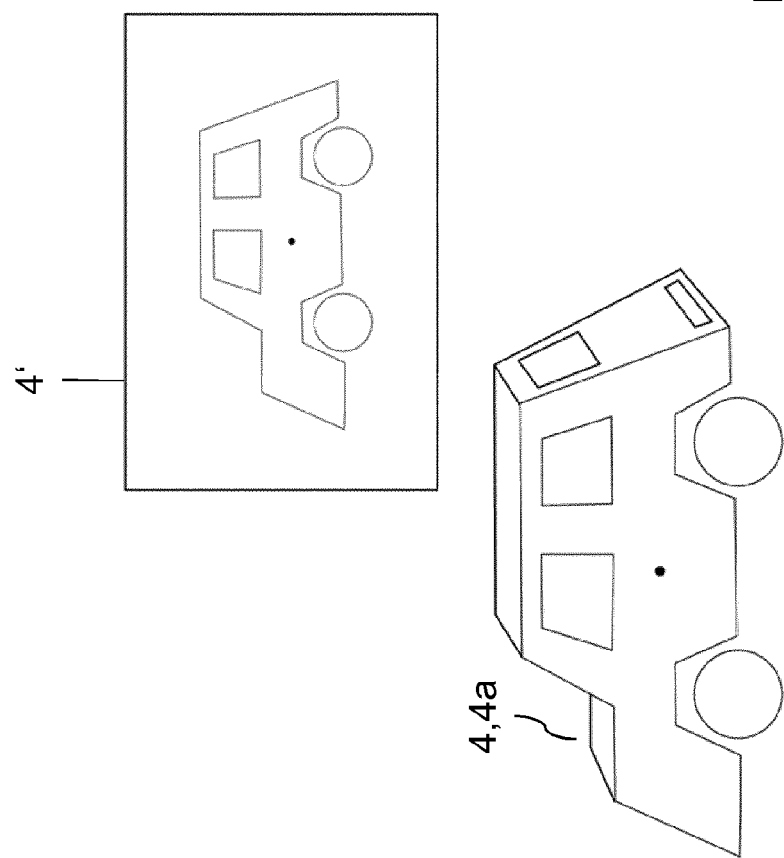

ALIGNMENT METHOD FOR A BEAM-DIRECTING UNIT OF AN INTERFEROMETRIC MEASURING DEVICE, AND MEASURING DEVICE FOR CARRYING OUT AN INTERFEROMETRIC MEASUREMENT BY MEANS OF LASER RADIATION

TECHNICAL FIELD

The invention relates to an alignment method for a beam directing unit of an interferometric measurement apparatus for directing a laser beam from a laser beam source at a plurality of measurement points of a measurement object and a measurement apparatus for carrying out an interferometric measurement using laser radiation.

BACKGROUND

Measurement apparatuses which have a beam source, preferably a laser beam source, a detector, a beam splitter and an evaluation unit are known for performing interferometric measurements on a measurement object. Here, an original beam generated by the radiation source is split into a measurement beam and a reference beam by the beam splitter. The measurement beam is guided to at least one measurement point on the measurement object and the measurement beam, which has been at least partially reflected or scattered by the measurement object, is superimposed with the reference beam on a detection surface of the detector such that a superimposition or interference signal between measurement beam and reference beam is measurable by the detector.

The measurement beam is directed at a specified measurement point of the measurement object by the beam directing unit. The reflected and/or scattered measurement beam passes through the beam directing unit again and is superimposed with the reference beam on the detector to form an optical interference.

In order to capture vibration data from measurement objects, such measurement apparatuses are embodied as vibrometers, preferably as laser Doppler vibrometers. The frequency of the measurement beam is influenced by the movement or vibration of the object surface, and so conclusions can be drawn about the movement of the object, in particular the vibration frequency of the object surface, from the superposition signal of the measurement and reference beam.

Such vibrometers are used, in particular, to carry out a vibration analysis at a plurality of measurement points on the measurement object. Such a measurement apparatus is described in WO 93/15386.

For a multiplicity of measurement situations, it would be desirable to determine not only the vibration frequency or vibration amplitude but also the direction of the vibration in the vibration data. By contrast, an interferometric measurement apparatus always records the vibration in the direction of the measurement beam when the measurement beam scattered or reflected by the measurement object runs back into itself (i.e., the optical axis of the measurement beam running toward the measurement object and the optical axis of the measurement beam returning from the measurement object are identical) and in direction of the angle bisector if the measurement beam scattered or reflected by the measuring object runs back at an angle to the incident measurement beam (and hence the optical axis of the measurement beam running toward the measurement object and the optical axis of the measurement beam returning from the measurement object include this angle).

Usually, interferometric measurement apparatuses in which the measurement beam scattered or reflected by the measurement object runs back into itself or virtually runs back into itself are used for vibration measurements. For these interferometric measurement apparatuses, it is therefore desirable to determine the beam path of the optical axis of the measurement beam running toward the object, in particular the angle of incidence of the measurement beam on the object at the measurement point, as the beam path of the measurement beam.

For interferometric measurement apparatuses in which the incident and returning measurement beams are at an angle to one another, it is accordingly desirable to determine the profile of the angle bisector at the measurement point, through which the incident beam and the returning beam and the bisector run, in particular the angle of the angle bisector relative to the object at the measurement point.

The term "beam path" of the measurement beam, in particular of the laser beam, or "determination of the beam path" thus designates here, and in the following, the path relevant to the measurement carried out by the measurement beam. The beam path therefore preferably contains the optical axis of the measurement beam running toward the measuring object, but equivalent information items can also be determined, in particular information items relating to an angle bisector as described above. To simplify the description in the present application, the following always refers to the beam path of the measurement beam, its angle of incidence, etc., but this always also includes equivalent information items, such as, e.g., the aforementioned angle bisector, instead of the measurement beam.

It is desirable to carry out an alignment of the beam directing unit, an assignment rule being determined which assigns corresponding control parameter for the beam directing unit to a possible measurement point on the measurement surface of the measurement object that can be impinged upon by the laser beam. In the case of a measurement point on the measurement surface that is specified by spatial coordinates, for example, control parameters can consequently be determined by the assignment rule in order to control the beam directing unit in such a way that the laser beam is incident at the desired measurement point.

The alignment is performed manually: By way of example, if the spatial coordinates of four alignment points are known in a common coordinate system, manual control of the beam directing unit such that the laser beam impinges on each of the four alignment points in succession allows an assignment rule to be ascertained on the basis of the spatial coordinates of the alignment points and the respectively assigned control parameters. Yanchu Xu, R. N. Miles, "An Identification Algorithm for Directing the Measurement Point of Scanning Laser Vibrometers", Optics and Lasers in Engineering, 22 (1995), 105-120, has disclosed an alignment method in which the distance between the alignment points and the distance between the beam directing unit and one of the alignment points is measured for four alignment points and the laser beam of the beam directing unit is manually directed at each of the four alignment points. An assignment rule is ascertained from the data obtained, as described above.

SUMMARY

The present invention is based on the object of simplifying, for the user, the alignment method for a beam directing unit of an interferometric measurement apparatus.

This object is achieved by a method, a measurement apparatus and the use thereof using one or more of the features as described herein. Advantageous embodiments can be found below and in the claims.

The method according to the invention is preferably designed to be carried out by the measurement apparatus according to the invention, in particular an advantageous embodiment thereof. The measurement apparatus according to the invention is preferably embodied to carry out the method according to the invention, in particular in an advantageous embodiment thereof.

The alignment method according to the invention for a beam directing unit of an interferometric measurement apparatus for directing a laser beam from a laser beam source at a plurality of measurement points of a measurement object includes the following method steps:

In a method step A, a plurality of spatially resolved images of at least one measurement surface of the measurement object are recorded from different perspectives. In a method step B, a three-dimensional model of at least the measurement surface of the measurement object is created by the plurality of spatially resolved images of the measurement surface. In a method step C, the laser beam is directed at at least three spatially different alignment points on the measurement surface by the beam directing unit by specifying control parameters of the beam directing unit for each alignment point. In a method step D, one or more spatially resolved alignment point images are captured such that each alignment point is captured in at least one alignment point image. In a method step E, spatial coordinates of the three-dimensional model are assigned to each of the at least three alignment points by the alignment point images and the three-dimensional model and/or the spatially resolved images on which the three-dimensional model is based. In method step F), an alignment of the beam directing unit is carried out by determining an assignment rule on the basis of the spatial coordinates of the alignment points and the respectively assigned control parameters, in order to use the assignment rule to assign corresponding control parameters for the beam directing unit to a measurement point on the measurement surface that is able to be impinged upon by the laser beam.

Here, the scope of the invention includes the method steps described above being carried out in a different order and/or method steps being combined and/or one method step being integrated into another method step.

The method according to the invention thus fulfils the purpose of carrying out an alignment of the beam directing unit in an interferometric measurement apparatus whose laser beam generated by a laser beam source is directed by a beam directing unit at a plurality of measurement points on a measurement object. The alignment is implemented on the basis of spatial coordinates of alignment points on the measurement surface of the measurement object and of the control parameters assigned in each case to the alignment points. The control parameters assigned to an alignment point are those control parameters which, if specified, direct the laser beam at the assigned alignment point by the beam directing unit.

In order to carry out a measurement, a plurality of measurement points impinged upon by the laser beam can consequently be specified on the measurement object, for example by specifying the spatial coordinates of the measurement points. Assigned control parameters are determinable for each measurement point by the assignment rule such that when these control parameters are specified the laser beam is directed at the respective measurement point by the beam directing unit.

In contrast to the previously known methods mentioned at the outset, the method according to the invention can be carried out more easily by the user; in particular, there are fewer sources of error for the user than in the previously known methods, and the risk of incorrect application or inaccurate alignment is reduced.

This improvement is achieved through the use of spatially resolved images to create a three-dimensional model of at least the measurement surface of the measurement object and to assign spatial coordinates of the three-dimensional model to the alignment points, as explained in more detail below for the individual method steps:

In method step A, spatially resolved images of at least one measurement surface of the measurement object are recorded from different perspectives.

Recording the spatially resolved images from different perspectives facilitates a much more precise determination of spatial coordinates: Spatial coordinates in two dimensions can be determined in many measurement situations when recording a spatially resolved image from just one perspective. However, a determination of spatial coordinates in three dimensions is particularly relevant for the present invention. Here, the invention has the particular advantage that, as a result of recording of spatially resolved images from different perspectives in method step A, the three-dimensional model according to method step D facilitates a significantly higher accuracy, particularly in three spatial dimensions. This also makes the assignment of spatial coordinates to the alignment points correspondingly more precise. The design of method step A according to the invention by the recording of spatially resolved images from different perspectives consequently forms the basis for a user-friendly and precise alignment method.

The measurement surface can be a partial area of the surface of a measurement article. Likewise, the spatially resolved images can additionally include the region surrounding the measurement article, for example an installation area for the measurement article and/or a background area. The measurement object can thus also comprise one or more measurement articles and one or more areas, in particular installation areas or background areas. The measurement surface can thus also include areas that are not the surface of a measurement article. The scope of the invention includes one or more alignment points being arranged on an area that is not the surface of a measurement article, for example on a background or installation area. Preferably, the measurement surface comprises at least the region of the measurement article or articles, in which measurement points should be arranged during a subsequent interferometric measurement. In particular, it is advantageous that the measurement surface comprises at least the area of the measurement article that can be impinged upon by the laser beam by the beam directing unit.

A three-dimensional model of at least the measurement surface of the measurement object is available after method step B has been carried out. It is consequently not necessary for the user to carry out their own measurements or specify certain reference points manually. Likewise, it is not necessary to additionally specify three-dimensional models created elsewhere, such as CAD models.

However, the method according to the invention and the measurement apparatus according to the invention moreover allow the use of previously known three-dimensional models in an advantageous manner: In some measurement situations, three-dimensional models of the measurement object or at least of parts of the measurement object, in particular a measurement article, are already available. This is the case, for example, if CAD or FE models have already been created for the construction of an article. Likewise, three-dimensional models can already be present from other measurements or previous sequences according to steps A and B. In an advantageous embodiment of the method according to the invention, a specified three-dimensional model is related to the three-dimensional model created in method step B such that there is a common coordinate system and consequently coordinates from the specified three-dimensional model can be transferred to coordinates of the three-dimensional model created in method step B, and vice versa. This is preferably implemented by virtue of one of the two models being "fitted" to the other, i.e., a linear transformation of one model into the coordinate system of the other model being determined by a suitable search algorithm such that the deviations according to a suitable evaluation function are minimal.

In particular, it is advantageous that the user already selects measurement points in the specified three-dimensional model. In this way, for example, a person skilled in the art who is entrusted with the construction of the measurement article can already identify technically particularly relevant points as measurement points in the specified three-dimensional model. In this advantageous embodiment, the spatial coordinates of these specified measurement points are consequently also known in the three-dimensional model created according to method step B, and so corresponding control parameters for carrying out a measurement at the specified measurement points can be assigned thereto using the assignment rule.

In a further advantageous embodiment, the spatial coordinates at which a measurement is carried out are transferred to coordinates of the specified model. In this advantageous embodiment, the points at which a measurement was carried out can also be easily traced when viewing the specified three-dimensional model, even in the case of subsequently chosen spatial coordinates for measurement points.

Thus, by specifying spatial coordinates, the three-dimensional model facilitates the use of a common coordinate system in a manner requiring little user outlay, for all points at least on the measurement surface. Such spatial coordinates can be chosen in a manner that is usual per se. In particular, the use of a Cartesian coordinate system is advantageous, but the use of other coordinate systems likewise also lies within the scope of the invention, for example cylindrical coordinates or spherical coordinates.

In method step C, the laser beam is directed at the at least three spatially different alignment points by the beam directing unit. To this end, control parameters are specified for each alignment point in such a way that the beam directing unit directs the laser beam at the respective alignment point when these control parameters are used. Method step C thus yields an assignment of control parameters for each alignment point, with the spatial coordinates of the alignment points in the three-dimensional model not needing to be known at this point in time.

In method step D, at least one alignment point image is captured. The scope of the invention includes the at least three alignment points being captured in a common alignment point image. Likewise, an alignment point image can only capture one alignment point or only a subset of the alignment points. The assignment of spatial coordinates of the three-dimensional model to each of the at least three alignment points is implemented according to method step E on the basis of the alignment point images and the three-dimensional model. Consequently, the coordinates of the alignment point are known in a coordinate system of the measurement object without the user having to carry out manual measurements or specify external measurement data. A further explanation and advantageous embodiment of the assignment of spatial coordinates to a picture element in a spatially resolved image can also be found in FIG. 6 and the description of the figures.

Firstly, control parameters and, secondly, spatial coordinates are therefore assigned to each alignment point by the method according to the invention in a manner requiring little user outlay. On the basis of this data, an assignment rule can be determined in accordance with method step F for the purposes of carrying out the alignment of the beam directing unit, and so only the specification of the spatial coordinates of the measurement point is required to carry out a measurement at a desired measurement point that can be impinged upon by the laser beam. Use of the assignment rule allows the corresponding control parameters to be calculated in order to direct the laser beam at this measurement point by the beam directing unit.

The method according to the invention and the measurement apparatus according to the invention allow the determination of an assignment rule for the alignment of the beam directing unit in a user-friendly manner. In this way, the alignment of the laser beam or the laser beams on these measurement points can thus be carried out with high precision for specified spatial coordinates of measurement points in order to be able to carry out vibration measurements. In some applications, it is desirable for the angle of incidence and/or the direction of incidence of the laser beam on the measurement point to also be determined for a specified measurement point. Particularly in the case of a vibration measurement, it is advantageous to use the angle of incidence and/or the direction of incidence of the laser beam to determine the direction in which the oscillation of the laser beam is measured. This renders it possible to also calculate a vibration of the measurement object in other directions at the measurement point, in particular in the direction of a surface normal at the measurement point, on the basis of the measurement data.

It is particularly advantageous to determine the angle of incidence and/or the direction of incidence of the laser beam on the measurement point by the assignment rule according to method step F.

The assignment rule renders known the control parameters which bring about a corresponding control and hence adjustment of the beam directing unit such that the laser beam is incident at the desired measurement point. If the way in which the control parameters affect the beam path of the laser beam in space is now additionally known, the angle of incidence or the direction of incidence of the laser beam on the measurement object can also be calculated for the control parameters determined by the assignment rule.

A beam directing unit model is advantageously used in the method according to the invention, in particular in order, as described above, to calculate the angle of incidence or the direction of incidence of the laser beam on the measurement object:

In order to determine, according to method step F, the assignment rule between the measurement points on the measurement surface that can be impinged upon by the laser beam and the corresponding control parameters for the beam directing unit, it is particularly advantageous if a beam directing unit model is specified, the latter specifying an assignment between the control parameters of the beam directing unit and the laser beam path in a beam directing unit coordinate system that is fixed relative to the beam directing unit, and vice versa.

Such a beam directing unit model is available, for example, or is easy to obtain if the beam directing unit changes the path of the laser beam in one or more angles, e.g., with the help of tiltable mirrors etc. The control parameters of the beam directing unit are in this case the set tilt angles of the mirrors etc. or are directly related thereto, and the laser beam path relative to the beam directing unit coordinate system can be specified on the basis of a mathematical model of the beam directing unit or on the basis of calibration measurements that depend on the control parameters. The same is also possible for all other types of beam directing units; by way of example, the laser beam path can be specified on the basis of the respective displacements when using linear displacement units or on the basis of the adjustment of the robotic arms in the case of robotic arms, etc., in each case in the beam directing unit coordinate system that is fixed relative to the beam directing unit.

In the simplest case, apart from the control parameters of the beam directing unit, the beam directing unit model does not contain any further parameters on which the path of the laser beam relative to the beam directing unit depends. This is the case, as a rule, if functionality and geometry of the beam directing unit are completely known and the laser beam path relative to the beam directing unit can be specified for each defined setting of the control parameters as a result. By way of example, this situation arises if the beam directing unit aligns the laser beam with the aid of the two adjustable angles of a gimbal-mounted mirror and the position of the mirror pivot point and the alignment of the mirror in the beam directing unit coordinate system are known.

However, it is also by all means conceivable for the beam directing unit model to contain, in addition to the control parameters, further system parameters that are initially undetermined and that also influence the path of the laser beam. In the specified example of the gimbal-mounted mirror, this would be the case, for example, if, due to manufacturing tolerances, the relative position of the mirror pivot point in the beam directing unit coordinate system were not sufficiently well known. Nevertheless, in this case, too, the laser beam path in the beam directing unit coordinate system can be specified on the basis of the control parameters; however, further system parameters, which are initially undetermined but should be ascertained later, are used to this end and could be the initially unknown coordinates of the mirror pivot point in the specific example. However, the presence of such further, initially undetermined system parameters in the beam directing unit model has no influence on the basic procedure and the description of the same in the following; the further, initially undetermined system parameters then only have to be ascertained as well, as will be explained in more detail below. By way of example, instead of at least three spatially different alignment points, at least four, at least five or possibly even at least six spatially different alignment points are required to this end in method steps C and E, depending on the situation. In the method according to the invention, at least three, more preferably at least four, in particular at least five and most particularly at least six spatially different alignment points are therefore used.

If there is such a beam directing unit model that indicates an association between the control parameters of the beam directing unit and the laser beam path in a beam directing unit coordinate system that is fixed relative to the beam directing unit, it is only still necessary to specify a suitable coordinate transformation between the beam directing unit coordinate system and the measurement object coordinate system, in which the three-dimensional measurement object model ascertained in method step B) is present, in order to determine the assignment rule according to method step F. This is because, by its coordinates in the measurement object coordinate system, its coordinates for each measurement point that can be impinged upon by the laser beam can also be specified in the beam directing unit coordinate system with the aid of this coordinate transformation, and ultimately this also allows the control parameters for the beam directing unit that are required to impinge laser light upon the measurement point to be determined on the basis of these coordinates in the beam directing unit coordinate system by the beam directing unit model.

The coordinate transformation between the beam directing unit coordinate system and the measurement object coordinate system consists of translations and rotations, which can be described with the aid of suitable translation and rotation matrices when Cartesian coordinate systems are used. The description may be more complex in the case of different types of coordinate systems, but the coordinate transformation nevertheless includes the same translations and rotations. In order to be able to specify the required coordinate transformation, essentially six independent transformation parameters have to be determined, which can easily be interpreted as three translational and three rotational degrees of freedom in the case of Cartesian coordinate systems. All coordinates in the measurement object coordinate system can be converted into coordinates of the beam directing unit coordinate system, and vice versa, using these initially unknown transformation parameters—however, for as long as the transformation parameters and possibly the above-described, initially undetermined system parameters have not yet been determined, these are only parameterized with the help of these parameters.

It is now the remaining object of method step F according to this advantageous embodiment to ascertain the described, yet initially undetermined parameters. To this end, use can now be made of a sufficient number of equations which contain these parameters and each establish relations between them that are independent of one another, and so the sought-after parameters can be determined on the basis of these equations in a mathematically known manner.

Specifically, the alignments points for which, according to method step C, the control parameters of the beam directing unit are known are used to determine these parameters. On the basis of the specified beam directing unit model, the laser beam paths are available for these alignment points in the beam directing unit coordinate system, possibly parameterized by the initially unknown system parameters. Additionally, according to method step E, the coordinates of the alignment points are already completely known in the measurement object coordinate system. Hence, there is a search for the transformation of the beam directing unit coordinate system into the measurement object coordinate system, by which the laser beam paths in the beam directing unit coordinate system are transformed into the measurement object coordinate system in such a way that the alignment points available in the measurement object coordinate system are located on the laser beam paths transformed into the measurement object coordinate system. A conditional equation can thus be set up for each point of incidence using the point-straight line distance. Solving the system of equations resulting herefrom for a sufficient number of points of incidence using relevant known mathematics yields the sought-after coordinate transformation.

In the simplest case, three alignment points and, in many cases, four alignment points will be sufficient for this purpose. In practice, care will be taken to use more than the minimum number of alignment points to determine the parameters sought, since the accuracy of the determination increases with each additional alignment point. Of course, in a system that is then overdetermined, a closed analytical solution will no longer be sought after; instead, use will be made of the relevant mathematical procedures for the optimal solution of such systems of equations.

In the concrete implementation of the determination of the unknown parameters, which are required to carry out method step F, the procedure is advantageously such that the unknown parameters are initially only estimated. With the aid of these estimated parameters, the laser beam paths present in the beam directing unit coordinate system are transformed into the measurement object coordinate system and their distances to the available alignment points in this coordinate system are determined there. From this, an error function is determined, e.g., by adding the distance squares. Using one of the known numerical methods for minimizing error functions, the parameters are now varied in such a way that the value of the error function is minimized. It was found that, as a result of this minimization, very good values are obtained for the sought-after parameters, which values are very well suited to the coordinate transformation between the two coordinate systems.

However, other methods which determine the described coordinate transformation or the associated parameters are also usable, for example those are also described in Yanchu Xu, R. N. Miles, loc. cit., and WO 93/15386.

Now that the coordinate transformation between the measurement object coordinate system and the beam directing unit coordinate system is available, the control parameters for the beam directing unit which are required for impinging any measurement point with laser light can now also be determined, as already described, by the beam directing unit model.

It is particularly advantageous that, in the specific case of the availability of a model of the beam directing unit, the angle of incidence of the laser beam in all spatial dimensions or the entire laser beam path when it is incident on the measurement object can also always be determined immediately in the measurement object coordinate system (or else in the beam directing unit coordinate system), in addition to the points of incidence of the laser beam on the measurement object; this is of considerable advantage for applications in vibrometry, in which vibrations are usually analyzed in three spatial directions.

It should be noted that the description of the procedure above has been based on the particularly preferred situation where a beam directing unit model is available, the latter indicating an association between the control parameters of the beam directing unit and the laser beam path in a beam directing unit coordinate system that is fixed relative to the beam directing unit, and vice versa. However, this is not absolutely necessary to carry out method step F:

Even if such a beam directing unit model is not available, it is still possible in method step F to specify an assignment rule between the measurement points that are able to be impinged upon by the laser beam and the associated control parameters for the beam directing unit. In the simplest case, the alignment points are defined in a suitable grid or pattern on the measurement surface in an advantageous embodiment. Since the control parameters of the beam directing unit are determined for each alignment point, the control parameters for measurement points which between the alignment points can be determined by linear, cubic or other interpolation. The closer the alignment points are, the smaller the deviations will be. The method according to the invention, in particular, offers the dense arrangement of a large number of adjustment points on the measurement object thanks to its options for high-level automation, and so, in contrast to other methods, a beam directing unit model is no longer required to establish an extremely precise assignment rule between the measurement points on the measurement surface that are able to be impinged by the laser beam and the corresponding control parameters for the beam controller.

In method step F, the respective beam direction with which the laser beam is incident at the respective measurement point on the measurement surface is preferably additionally determined, in particular by using a suitable modeling or parameterization of the effect of the beam directing unit on the laser beam path, preferably by a beam directing unit model, as described above.

The method according to the invention uses spatially resolved images, which are created in method steps A and E. The scope of the invention includes the creation of all spatially resolved images by the same image recording unit, in particular to perform both method step A and method step E by the same image recording unit. The use of different image recording units for creating the spatially resolved images is also within the scope of the invention, in particular a first image recording unit for carrying out method step A and a second image recording unit for carrying out method step E.

Digital cameras, in particular cameras with a CCD or CMOS image sensor, are preferably used as the image recording unit. The scope of the invention also includes the case of creating the respective location-triggered image by a scanning method: The scope of the invention includes the use of an image recording unit in which individual points of the object to be imaged are recorded in temporal succession and a spatially resolved image is constructed from a plurality of separately recorded points, for example by a computer unit.

The image recording unit can also comprise an illumination unit which illuminates the measurement object while the image recording unit records images. Thus, image recording units for capturing the three-dimensional shape of an object, which comprise a pattern projection unit, in particular a stripe projection unit and a camera, typically a black-and-white camera, are known, wherein the camera is used to accurately capture the location of a light pattern projected on the object by the projection unit. Preferably, such an image recording unit is used to carry out method step A.

Particularly preferably, the image recording unit also comprises a color camera for recording a color image in order to assign a realistic, in particular colored and/or textured image representation of the actual surface of the model to the surface of a created three-dimensional model of the object. The use of such image recording units is particularly advantageous for carrying out method step A.

Advantageously, use is therefore made of an image recording unit which, as described above, comprises a projection unit for projecting a pattern, in particular a stripe pattern, on the object and an assigned camera, in particular a black-and-white camera. A spatially resolved image is consequently captured with this camera when the pattern is projected, and so a three-dimensional model can be created from the plurality of spatially resolved images in a manner known per se, in particular according to the method of structured light projection. A further camera, in particular a color camera as described above, is preferably used to record a further camera image, in particular a color image, for recording the texture of the object, preferably without a stripe projection taking place, this further camera image being recorded simultaneously with a spatially resolved image, or at a short time interval thereafter. In particular, it is consequently particularly advantageous to respectively alternately record a spatially resolved image with stripe projection and, in particular at a short interval thereafter, a color image without projection of the stripe pattern: The above-described image recording unit records both images with projected stripes and images without the stripes in quick succession. The images without the stripes contain the spatially resolved appearance of the measurement object (texture). Supported by the brief time interval between the recordings, the 3D coordinates determined by the stripe projection can each be assigned pixels of the texture.

Conversely, 3D coordinates can be assigned to a pixel of the texture.

In this way, texture information, which corresponds to the actual optical impression of the surface of the model, can thus also be assigned to the three-dimensional model. Advantageously, these or a selection of these images are used for texture information as alignment point images.

Due to the short temporal interval, the perspective and position of the image recording unit in the case of images recorded simultaneously or in quick succession are identical or only slightly different, even if, for example, the user, using a hand-held model, moves the latter relative to the object.

The use of image recording units which comprise a plurality of spatially resolved image detectors is also within the scope of the invention, with the spatially resolved image of the image recording unit being created by suitable combination of the image information from the plurality of image detectors.

Due to the short temporal interval, the perspective and position of the image recording unit in the case of the alignment point image and spatially resolved image three-dimensional model to be created are identical or only slightly different, even if, for example, the user, using a hand-held model, moves the latter relative to the object.

The use of image recording units which comprise a plurality of spatially resolved image detectors is also within the scope of the invention, with the spatially resolved image of the image recording unit being created by suitable combination of the image information from the plurality of image detectors.

The object on which the invention is based is also achieved by a measurement apparatus for carrying out an interferometric measurement by laser radiation, having one or more features described herein.

The measurement apparatus comprises one or more laser beam sources for generating at least one laser beam as a measurement beam and at least one reference beam, a detector, an evaluation unit which is connected to the detector for evaluating measurement signals from the detector and a beam directing unit. The measurement apparatus is embodied to direct the measurement beam at a plurality of spatially different measurements on the measurement object by the beam directing unit and to superimpose the measurement beam, which has been at least partially reflected or scattered by the measurement object, and the reference beam on a detection surface of the detector such that a superimposition or interference signal between measurement beam and reference beam is measurable by the detector.

Such measurement apparatuses are known per se and can, for example, be embodied as vibrometers in order to ascertain vibration data of the measurement object.

What is essential is that the measurement apparatus comprises an image recording unit for recording a plurality of spatially resolved images of at least one measurement surface of the measurement object from different perspectives and that the measurement apparatus comprises a controller which is embodied to create a three-dimensional model of at least the measurement surface of the measurement object by the plurality of spatially resolved images of the measurement surface and to carry out an alignment of the beam directing unit by the three-dimensional model in order to assign corresponding control parameters for the beam directing unit to a measurement point on the measurement surface that can be impinged upon by the laser beam.

The measurement apparatus according to the invention facilitates an alignment of the beam directing unit in a particularly user-friendly manner by the described assignment of corresponding control parameters to predetermined measurement points on the measurement surface, preferably in accordance with the method according to the invention, in particular an advantageous embodiment thereof.

Preferably, the measurement apparatus comprises an image recording unit which is fixed relative to the beam directing unit for capturing at least one spatially resolved image of the measurement surface. In this way, spatial coordinates can advantageously be assigned to alignment points according to method step E, as explained in more detail below.

The assignment of spatial coordinates to the alignment points is preferably carried out as follows: In method step E, each alignment point is advantageously initially localized in at least one alignment point image that includes this alignment point. The localization is preferably implemented by ascertaining the image coordinates of the alignment point, an x,y position or an image pixel localization of the alignment point in the alignment point image or a combination thereof, particularly preferably as explained in more detail in FIG. 6 and the description of the figures.

An alignment point can be selected by the user specifying an optically characteristic structure. In an advantageous embodiment, the user selects an alignment point in a spatially resolved image, for example by clicking on it using a computer mouse or a comparable input.

Other forms of selection of the alignment point in a spatially resolved image are also within the scope of the invention:

At least one alignment point, particularly preferably all alignment points, is advantageously selected automatically. The method according to the invention offers the particular advantage that the alignment points are able to be specified and that a three-dimensional model of at least the measurement surface of the measurement object is available. The method according to the invention is therefore particularly suitable for localizing alignment points in the three-dimensional model by automated methods. By way of example, these can be points that are distinguished due to their structure, shape or color. Likewise, due to the automation, a multiplicity of alignment points can also be specified, which lead to an overdetermined system, so that greater accuracy can be achieved by alignment methods known per se. In particular, it is advantageous to automatically specify more than 5, preferably more than 10, further preferably more than 50 alignment points.

On account of the assignment of spatial coordinates of the three-dimensional model to each of the at least three alignment points according to method step E, the method according to the invention thus has the particular advantage that it is also possible to use alignment points at locations on the measurement surface that are not distinguished by a particular shape, structure or color:

In an advantageous embodiment, spatial coordinates in the three-dimensional model are specified for at least one, preferably for all, alignment points. The point of incidence of the laser beam is captured in a spatially resolved image by an image recording unit. In this case, it may be necessary for the user to manually carry out at least one alignment in such a way that the laser beam lies within the image recorded by the image recording unit. Subsequently, the laser beam is directed at the previously selected location by specifying control parameters. This can be implemented even if no assignment rule has yet been determined in accordance with method step F, in particular by "readjusting": By approximation methods known per se, it is possible to specify a change in location of the point of incidence of the laser beam by control parameters and capture this in turn by a spatially resolved image of the image recording unit. The control parameters can be corrected by comparing the spatially resolved images in order to approach the desired location. An iteration of these steps ultimately leads to the laser beam being directed at the desired location, and so the spatial coordinates of this point are also assigned to corresponding control parameters. Further advantageous embodiments of readjustment are explained over the course of the further description.

For the aforementioned advantageous embodiment of the method according to the invention, the alignment point specified by spatial coordinates in the three-dimensional model is preferably localized in the spatially resolved image of the image recording unit. It is therefore advantageous to be able to assign spatial coordinates of the three-dimensional model to the picture elements of the image of the spatially resolved image recording unit. This is also possible within the scope of the method according to the invention in a manner requiring little outlay, as explained in more detail below.

The spatially resolved image thus represents an alignment point image for this alignment point after the alignment point has been selected or specified in this image. Spatial coordinates in the three-dimensional model can be assigned to the alignment point in method step E on the basis of the alignment point image and the three-dimensional model.

A further simplification for the user can be achieved by the measurement object being impinged upon by the laser beam during at least one image recording:

There are optically clearly distinguishable structures on some measurement surfaces. These can be due to differences in the surface in terms of color, surface type, surface material or local geometric structures, for example protrusions or recesses or else existing markings or irregularities such as scratches.

Such optically distinguishable structures facilitate an assignment of spatial coordinates. Until now, the assumption has been that such structures are absolutely necessary for the alignment of a beam directing unit. However, the method according to the invention and the measurement apparatus according to the invention offer the possibility of carrying out an alignment without resorting to such structures: The points of incidence of the laser beam on the measurement surface are preferably used to carry out an assignment of spatial coordinates according to method step E.

In an advantageous embodiment of the method according to the invention, when carrying out method step D, a spatially resolved alignment point image is captured for at least one alignment point while the laser beam is incident on this alignment point. In particular, it is advantageous that at least one alignment point image is captured for each alignment point while the laser beam is incident on the respective alignment point. In particular, it is advantageous that the beam directing unit moves the laser beam to different points on the measurement object when capturing an alignment point image, preferably when capturing a plurality of alignment point images, in particular in such a way that each alignment point image includes at least one, preferably exactly one, alignment point impinged upon by the laser beam.

An alignment point image is advantageously captured for each alignment point respectively while the respective alignment point is impinged upon by the laser beam. The provision of an alignment point image in which a plurality of alignment points are impinged upon by the laser beam is also within the scope of the invention, for example by averaging a plurality of partial images.

Since the alignment point is impinged upon by the laser in the captured spatially resolved alignment point image, the alignment point can be localized in the alignment point image in a particularly simple and precise manner. As described above, it is therefore not necessary, in particular, to select the alignment point at a location that is particularly distinguished by its shape, texture or color, since it is not necessary to retrieve the alignment point in an image of the surface by finding the aforementioned optical structural features.

Consequently, in this advantageous embodiment, an assignment of the alignment point image to the three-dimensional model, in particular the assignment of a perspective and/or a viewing location in the three-dimensional model to the alignment point image can be implemented with the aid of the location impinged upon by the laser. An "optical structure" for image processing is thus created by the laser, and so optically clearly distinguishable structures need not necessarily be present on the measurement object itself.

In an advantageous embodiment of the method according to the invention, at least one alignment point image is captured in method step D for at least one alignment point, preferably for each alignment point, while the laser beam is incident on this alignment point. This results in the advantage that the position of the alignment point in the alignment point image is defined by the incident laser beam. Consequently, it is possible to localize the alignment point in the alignment point image in a simple manner using image analysis methods known per se. In particular, the use of pattern recognition methods for localizing the alignment point in the alignment point image is advantageous.

For typical illumination situations, the alignment point in the alignment point image impinged upon by the laser beam has a higher intensity, in particular a greater brightness, in comparison with the surrounding picture elements. The alignment point is consequently localized in an advantageous embodiment by localizing the picture element with the greatest light intensity.

In the majority of typical measurement situations, the laser beam has a different color than the surface of the measurement object. Therefore, in an advantageous embodiment, the alignment point is localized in the alignment point image by localizing a colored spot in the color of the laser beam.

Likewise, it is possible to capture an alignment point image in which the alignment point is not captured by the laser beam and the intensity values are compared with a further alignment point image in which the alignment point is impinged upon by the laser beam. In particular, the alignment point can be localized by forming the difference between the brightness values in a spatially resolved manner when the two aforementioned images are compared. In a further advantageous embodiment, the alignment point is therefore localized in the alignment point image by comparison, in particular forming the difference, with a further spatially resolved image which comprises the alignment point not impinged upon by the laser beam.

In order to create recognizable optical structures, as described above, it is advantageous, in particular, that at least two spatially resolved images comprising the alignment point are recorded for at least one alignment point, preferably for all alignment points, while the alignment point is impinged upon by the laser beam, in particular that the at least two images are captured from different perspectives.

In an advantageous embodiment, a separate alignment point image, in which only the respective alignment point is impinged upon by the laser, is captured for each alignment point. As a result, each alignment point can be localized in a simple manner in the associated alignment point image.

The scope of the invention also includes an alignment point image capturing a plurality of alignment points impinged upon by the laser beam.

The capture of the alignment point image while the laser beam is incident on the alignment point thus has the advantage of simple localization of the alignment point in the alignment point image. Moreover, control parameters are directly assigned to the respective alignment point, namely those control parameters for directing the laser beam at the respective alignment point by the beam directing unit while the alignment point image is being captured.

However, the scope of the invention also includes the capture of an alignment point image without the alignment point being impinged upon by the laser beam during the capture.

In an advantageous embodiment, at least one alignment point, preferably all alignment points, is labeled on the measurement surface by an optical marker. In this embodiment, the alignment point is localized in the alignment point image by pattern recognition methods known per se. In particular, it is advantageous to use markers that are optically distinguishable from one another to mark the alignment points such that each alignment point can be clearly localized, in particular even if more than one alignment point is captured in an alignment point image.

The scope of the invention includes, even if optical markers are used, the impingement by the laser beam of the alignment point identified by the optical marker while the alignment point image or images are being captured.

Advantageously, the alignment points labeled by optical markers are captured without being impinged upon by the laser beam and, in a separate step, the alignment point labeled by the optical marker is impinged upon by the laser beam by the beam directing unit in order to ascertain the associated control parameters of the beam directing unit. In an advantageous embodiment, the markers are attached to an area that is not the surface of a measurement article. In this case, the measurement object comprises—as described at the outset—one or more measurement articles on which, for example, vibration data are to be ascertained, and also further surfaces on which one or more markers are attached. By way of example, the markers can be attached to a background area, in particular a wall behind a set-up location for the measurement article or articles.

Advantageously, the control parameters are automatically determined by evaluating successively recorded alignment point images from an unchanged recording position, in particular an unchanged position of the image recording unit used to capture the alignment point images. Preferably, the control parameters are automatically "readjusted" in this case such that the laser is incident on the optical marker, in particular as described above. This is preferably carried out for each of the optical markers.

In a further advantageous embodiment, the creation of the three-dimensional model according to method step B is simplified by the laser beam by virtue of, in method step A, the laser beam in the case of at least two of the spatially resolved images recorded in method step A being directed at a location that is captured by both images. This simplifies an assignment of these two images in method step B since the typically clearly visible laser point of incidence is captured in both images. In this advantageous embodiment, an optical structure was thus created by the laser in order to simplify the creation of a three-dimensional model from the plurality of spatially resolved images recorded in method step A or to facilitate this with greater precision.

In method step E, spatial coordinates of the three-dimensional model are assigned to the alignment point captured in an alignment point image, in particular to the alignment point localized in the alignment point image according to one of the above-described advantageous embodiments.

In an advantageous embodiment, in method step D, at least two, preferably at least three, in particular at least five alignment point images are captured from different perspectives for each alignment point. As a result, image processing methods known per se facilitate the assignment of spatial coordinates to the alignment point on account of the presence of images from different perspectives. In particular, it is advantageous that method step D is integrated into method step A. In this advantageous embodiment, a plurality of spatially resolved alignment point images are thus captured for at least one alignment point, preferably for all alignment points, from different perspectives while a plurality of spatially resolved images at least on the measurement surface of the measurement object are recorded from different perspectives according to method step A. In this advantageous embodiment, the alignment points are consequently already able to be localized in the plurality of spatially resolved images recorded in method step A (with integrated method step D).

This is preferably implemented by the alignment points being impinged upon by the laser beam by the beam directing unit while the plurality of spatially resolved images are recorded and the adjustment points are localized, in particular according to any one of the preceding localization processes. Typically, the laser beam cannot be simultaneously directed at two alignment points by the beam directing unit. Correspondingly, if the plurality of spatially resolved images overlap in a region in which there is an alignment point, some of the images can have the alignment point in the state impinged by the laser beam and some of the images can have said alignment point in the state not impinged by the laser beam. Image processing methods known per se can nevertheless be used to localize the laser point, even when such images are present. In particular, in a preferred embodiment, the alignment point can nevertheless be localized by averaging the images in the overlapping regions, in particular by one of the aforementioned localization processes such as, e.g., finding an increased light intensity and/or a color assigned to the laser and/or comparing two images, with the alignment point being impinged upon by the laser beam in only one of the two images.

When a plurality of alignment point images are captured from different perspectives that include the same alignment point, method step E with the assignment of the spatial coordinates of the three-dimensional model to the respective alignment point is preferably also carried out in method step B during the creation of the three-dimensional model.

In method step B, the three-dimensional model of at least the measurement surface of the object is created on the basis of the plurality of spatially resolved images. Correspondingly, for each of the spatially resolved images, spatial coordinates can be assigned to each picture element of at least the measurement surface in a manner requiring little outlay. Therefore, in an advantageous embodiment, the alignment point is localized in the spatially resolved image and spatial coordinates are assigned accordingly to the alignment point in the case of those images which include an alignment point. In this case, as described above, the alignment point is preferably automatically detected in the images by various image processing methods.

In a further preferred embodiment, a plurality of alignment point images are recorded, which are captured from the same location and with the same perspective relative to the object.

This results in the advantage that the assignment of spatial coordinates of the three-dimensional model according to method step E can be carried out in the same way for all alignment points localized in an alignment point image, particularly preferably by an assignment rule for the alignment point coordinates.

It is therefore advantageous to capture the alignment point images by an image recording unit which is fixedly arranged relative to the beam directing unit. It is often desirable to obtain an image captured by the image capturing unit, in particular a video recording of the measurement object, approximately from the perspective of the beam directing unit. This gives the user a realistic idea of the perspective from which the laser beams are emitted to carry out the measurement. Typical beam directing units therefore contain an image recording unit which is fixedly arranged on the beam directing unit. It is therefore particularly advantageous to additionally use this image recording unit for recording the alignment point image or images. Likewise, an image recording unit separately positioned in the vicinity of the beam directing unit can be used, firstly, to likewise capture an image of the measurement object for the user and, secondly, to capture the alignment point image or images. By way of example, such an image recording unit can be positioned on a tripod next to the beam directing unit.

When carrying out a measurement with directing the laser beam at a plurality of specified measurement points, the beam directing unit is typically not moved relative to the object since such a relative movement between the beam directing unit and the object would have to be compensated for by changing the assignment rule. Carrying out a realignment is advantageous if such a relative movement occurs. Provided the relative movement took place in a defined manner and is known, the assignment rule can also be corrected by calculation. By way of example, this is the case if the measurement apparatus is moved relative to the object in a defined, specified manner by a movement unit, for example a linear transport unit or a robot arm.

When a plurality of alignment point images are captured at the same location and with the same perspective relative to the measurement object, spatial coordinates of the three-dimensional model are preferably assigned to picture elements of the alignment point images. Since all the alignment point images in this preferred embodiment are captured at the same location and with the same perspective relative to the measurement object, a common assignment rule can be ascertained for picture elements of the alignment point images.

The recording location for the alignment point image is advantageously determined by at least one alignment point image. This is preferably implemented by comparing the alignment point image with views of the object from different perspectives calculated using the three-dimensional model. This allows automated determination of the recording location of the alignment point images in the three-dimensional model. Likewise, this allows spatial coordinates in the three-dimensional model to be assigned to each location in the alignment point image.

Typically, digital cameras, in particular cameras with a CCD or CMOS image sensor as described above, are used as image recording unit for recording the spatially resolved images, which have a multiplicity of image pixels. In the advantageous embodiment described above, spatial coordinates can thus be assigned to each image pixel of an alignment point image; in particular, three-dimensional spatial coordinates on the measurement surface in the three-dimensional model can be assigned to each image pixel showing the measurement surface. As already described, this assignment in the aforementioned advantageous embodiment is the same for all alignment point images, and so it only needs to be determined once in order to assign spatial coordinates in the three-dimensional model to the respective localized alignment point in each of the alignment point images.

Advantageously, in method step C, the at least three alignment points are specified on the measurement surface and the laser beam is automatically directed at each of the three alignment points by the beam directing unit, in particular in order to capture an alignment point image for each alignment point while the laser beam impinges upon the respective alignment point. The at least three alignment points can be specified by the operator or automatically using the three-dimensional model created in method step B.

The beam directing unit has not yet been aligned at this stage; i.e., corresponding control parameters for the beam directing unit cannot yet be determined—at least not with sufficient accuracy—when the spatial coordinates of an alignment point are specified. The automated directing of the deflection beam at an alignment point is therefore advantageously implemented by automated recording of a video frame:

Spatially resolved images are recorded by an image recording unit, particularly preferably by the above-described image recording unit arranged fixedly relative to the beam directing unit, said images capturing the alignment point and the laser beam incident on the measurement surface. To this end, it may be necessary for the user to initially direct the laser beam at at least one desired point on the measurement surface. However, this is possible in a manner requiring little user outlay since this does not require high precision.

Even if the beam directing unit has not yet been aligned, the position of incidence of the laser beam on the object can still be displaced in approximate fashion by changing the control parameters, in particular by "readjusting": By way of example, using algorithms known per se, the laser beam can be displaced slightly in any direction in an assumed coordinate system and then a check can be carried out by analyzing the spatially resolved image as to whether the displacement is taking place in the correct direction and, where necessary, the displacement direction can be corrected so that the measurement beam is iteratively directed at the alignment point even without a beam directing unit alignment. The target situation in which the laser beam is incident on the alignment point can also be identified by the spatially resolved video frame. Correspondingly, the control parameters then present can be assigned to this alignment point.

To identify/localize the laser beam in the spatially resolved image, it is advantageous to temporarily darken the image (in particular by closing a shutter of a camera of the image recording unit and/or by shortening the exposure time) such that it is preferably substantially only the laser beam that is captured by the camera and, in particular, overexposure of the camera image by the laser beam is avoided. The picture element coordinates of the laser beam are preferably determined by suitable averaging of picture element coordinates with brightness levels above a threshold. These picture element coordinates of the laser beam are preferably compared to the previously determined picture element coordinates of the alignment point.

In this advantageous embodiment, the alignment points can be specified using optical markers which are detected in the spatially resolved image by image analysis. In particular, however, it is advantageous that the user selects alignment points in the spatially resolved image captured by the image recording unit. A particularly advantageous, user-friendly selection can be made by selecting the alignment points in the spatially resolved image, for example by clicking on them using a computer mouse. In this case, the spatially resolved image is additionally compared to the three-dimensional model in order to assign spatial coordinates in the three-dimensional model to the alignment point selected by the user.

In the case of the above-described use of optical markers, it is particularly advantageous that, prior to method step A, at least three optical alignment point markings are applied to the measurement surface as markers in a method step A0. In particular, it is advantageous that the assignment of spatial coordinates to the alignment points is implemented by automatic pattern recognition in method step E. In a further preferred embodiment, in method step C, the laser beam is automatically directed by the beam directing unit at each of the at least three alignment points in order to capture an alignment point image for each alignment point.

An essential component of the method according to the invention is the creation of a three-dimensional model according to method step B by the spatially resolved images recorded in method step A. In method step B, the three-dimensional model is advantageously created by photogrammetry. Photogrammetric methods are known per se from geodesy and remote sensing. In the meantime, however, photogrammetry is also used to ascertain the spatial position and/or the three-dimensional shape of an object by a plurality of spatially resolved measurement images.

The object set forth at the outset is therefore also achieved by using photogrammetry to carry out an alignment of a beam directing unit for directing a laser beam from a laser beam source at a plurality of measurement points of a measurement object, in particular to carry out an alignment of a beam directing unit of a vibrometer.

To facilitate a precise determination of the three-dimensional model, the spatially resolved images are preferably captured in such a way that, at least in the edge regions, there is an overlap with the respective subsequent image. On account of the typical size of the measurement objects for which the method according to the invention is used, the use of processes of close-range photogrammetry, in particular, is advantageous:

One possible embodiment is the determination of unambiguous features in the spatially resolved images and the subsequent triangulation of coordinates. Identifiable features are determined in the spatially resolved images by scale-invariant feature transform SIFT, in particular according to U.S. Pat. No. 6,711,293 B1, speeded-up robust features SURF and similar relevant known methods. These features are searched for in a plurality of the spatially resolved images and assigned to one another. The assignment is carried out by an algorithm that determines roughly matching neighbors for the features in a multidimensional space spanned by the feature vectors (SIFT, SURF, etc.). Examples of this are simple trial and error (brute force) or the Fast Library for Approximate Nearest Neighbor Search (FLANN: Marius Muja and David G. Lowe, "Fast Approximate Nearest Neighbors with Automatic Algorithm Configuration", in International Conference on Computer Vision Theory and Applications (VISAPP'09), 2009). Other methods are also conceivable. Based on the imaging properties of the image recording unit used, the perspectives of the images can then be calculated and, coordinates can be ascertained on the basis of the feature correspondences and preferably by triangulation. Carrying out this coordinate ascertainment multiple times results in a plurality of 3D coordinates, which are combined to form a model. This corresponds to method step B. An overview of this and other available such methods can also be found at https://en.wikipedia.org/wiki/Structure_from_motion.

Another possible embodiment here is the use of the aforementioned pattern projection known per se, preferably in the embodiment of a stripe projection. In the case of the pattern projection, the time-consuming search for suitable neighbors in a plurality of the spatially resolved images is dispensed with, and the triangulation can be implemented on the basis of the known relationship between the pattern projection unit and camera. Here, too, a plurality of 3D coordinates are obtained, which are combined to form a model in accordance with method step B. Movable measurement apparatuses for recording a plurality of spatially resolved images of an object and creating a three-dimensional model are already commercially available. In addition to a recording unit, in particular a camera, for capturing the spatially resolved image, the image recording units typically also comprise a projection unit for projecting a pattern, in particular for projecting stripes for the method of structured light projection.

One of the commercially available 3D scanners specified below is preferably used to this end (the names specified below are trade names whose rights reside with the respective proprietors): Artec Eva, Artec Spider, Creaform GoScan 3D, Creaform Handyscan 3D, Creaform Metrascan 3D.

Various advantageous embodiments of the method according to the invention require the assignment of spatial coordinates of the three-dimensional model to a picture element of a spatially resolved image.

The determination of relative position and orientation of a three-dimensional model in a spatially resolved image is known from the prior art, for example from: DOI: 10.1109/ICCV.2017.23. The relative position and orientation, which are known in that case, can be used to determine for each picture element of the associated spatially resolved image whether it represents a part of the surface of the three-dimensional model. Should it represent a part of the surface of the three-dimensional model, the closest known 3D coordinates of the surface of the three-dimensional model can be determined and the 3D coordinates of the part of the surface that is represented in the respective picture element of the spatially resolved image can be determined by suitable interpolation. In any case, determining the relative position and orientation of the three-dimensional measurement object model in a spatially resolved image then also allows the assignment of the associated 3D coordinates in the three-dimensional measurement object model to each location, in particular to each picture element of the spatially resolved image. Further advantageous embodiments are shown in FIGS. 5 and 6 and explained in the associated description of the figures.

In a further advantageous embodiment, an assignment of spatial coordinates in the three-dimensional model to the picture elements of the alignment point images is simplified by integrating method step D in method step A: In this advantageous embodiment, the plurality of spatially resolved images are recorded according to method step A and the alignment point images according to method step D are each recorded from a recording location which corresponds to, or only slightly deviates from, a recording location of at least one of the spatially resolved images according to method step A. As a result, it is thus possible to assign each alignment point image to at least one of the spatially resolved images according to method step A. When the three-dimensional model is determined according to method step B, spatial coordinates are preferably assigned to the picture elements of the images recorded in method step A. Correspondingly, spatial coordinates can be assigned to the alignment image or images in a manner requiring little outlay by resorting to the assignment of the corresponding spatially resolved image in accordance with method step A.

In particular, it is advantageous to use an image recording unit which captures both the plurality of spatially resolved images according to method step A and the alignment images according to method step D. This facilitates recording of a spatially resolved image according to method step A and of an alignment image in a simple manner, preferably at the same time or by virtue of a spatially resolved image according to method step A and an alignment image being recorded in quick succession, particularly preferably at a time interval of less than 1 second, preferably less than 0.5 seconds.

The alignment method according to the invention is used to align a beam directing unit of an interferometric measurement apparatus. Consequently, a laser beam, as a measurement beam, is directed at a measurement point of the measurement object by the beam directing unit. The reflected and/or scattered measurement beam passes through the beam directing unit again in order to facilitate an interferometric measurement in the measurement apparatus. In an advantageous embodiment, the laser beam is divided into at least one measurement beam and at least one reference beam by the interferometric measurement apparatus.

The measurement beam is directed at a specified measurement point on the measurement object by the beam directing unit, and the measurement beam reflected and/or scattered by the measurement object passes through the beam directing unit again in order to be superimposed with the reference beam to form an optical interference. To the end, the measurement apparatus preferably comprises at least one detector in order to detect the interference signal. The desired measurement data, in particular vibration data and/or a speed of the movement of the surface of the object at the measurement point, can be determined from the interference signal. The basic structure of the measurement apparatus can be embodied, in a manner known per se, like an interferometer, in particular a vibrometer, preferably a heterodyne interferometer or a heterodyne vibrometer.

In order to ascertain a vibration in a plurality of dimensions at a measurement point, carrying out method steps C, D and F for a plurality of measuring heads, preferably for at least three measuring heads, which each comprise a laser beam source and a beam directing unit, is advantageous. In particular, it is advantageous to carry out the aforementioned method steps for a plurality of measuring heads that are fixedly arranged relative to one another. Measurement apparatuses with three measuring heads are available, for example, from the applicant under the name "PSV-3D-Scanning Vibrometer".

The method according to the invention provides for the use of at least three spatially different alignment points on the measurement surface. From a mathematical point of view, the system is sufficiently determined by using three alignment points and by specifying the distance from at least one alignment point to the beam directing unit. Likewise, four spatially different alignment points can be specified for a sufficiently determined system, in which case a separate specification or measurement of the distance to the beam directing unit is not required. Advantageously, more than four spatially different alignment points are specified in order to obtain an overdetermined system and thus to reduce the effect of measurement errors.

A distance measuring unit is advantageously used, in particular to determine the distance of the alignment points from the measurement apparatus, in particular from the beam directing unit. The number of parameters to be determined is reduced accordingly: If the distances to the alignment points are known, at least three alignment points are needed. If these distances are not known, at least four alignment points are needed to determine all parameters of the assignment rule.

The three-dimensional model of at least the measurement surface of the measurement object can be designed in a manner known per se from photogrammetry for capturing the shape of three-dimensional objects. In particular, the scope of the invention includes the creation in method step B of a three-dimensional model which has a point cloud, preferably a polygon mesh, in particular an irregular triangular mesh. As described above, the three-dimensional model further preferably comprises texture information items of the object, in particular one or more spatially resolved images of the appearance of the measurement surface and further preferably additionally the associated picture element coordinates in the spatially resolved images of the measurement surface (so-called texture coordinates) for each point of the surface with 3D coordinates.

The three-dimensional model therefore preferably comprises a list of points on the surface of the object, each with 3D coordinates and texture coordinates, and a list of triangles which approximate the surface of the measurement object, in which the vertices are constituents of the list of points.

In an advantageous embodiment, the measurement apparatus according to the invention has a focusing device for the laser beam. This is advantageous in order to impinge on a precise measurement point, in particular with the smallest possible extent, on the measurement object. Typically, different measurement points are at different distances from the measurement apparatus, in particular from the beam directing unit. The focusing device is therefore advantageously connected to the controller and the controller is embodied in such a way that the three-dimensional model is used to determine a distance of the measurement apparatus and/or the beam directing unit from the measurement point impinged upon by the laser beam and to control the focusing device in such a way that the laser beam is focused on the measurement point.

A high precision of the three-dimensional model is desirable for this advantageous embodiment. This demonstrates a further advantage of the method according to the invention as a particularly precise determination of the three-dimensional model according to method step B is possible as a result of spatially resolved images being recorded from a plurality of perspectives according to method step A.

A laser beam with a wavelength in the visible range is used as the measurement beam in the case of a multiplicity of interferometric measurements. Such a laser beam can be captured without much outlay using typical image recording units. In the method according to the invention and in the measurement apparatus according to the invention, the laser beam source for generating a measurement and reference beam of the interferometric measurement apparatus is therefore advantageously used as a laser beam source for the alignment. The laser beam used for the alignment thus corresponds to the measurement beam, with no interferometric measurement typically taking place while the alignment is being carried out, in particular during method steps A, C and D.

The scope of the invention likewise includes the use of a laser beam generated by an additional laser beam source for the purposes of the alignment:

The use of a laser beam which cannot be detected, or which can only be detected with insufficient accuracy, by conventional image recording units is desirable for some applications of interferometric measurements. In particular, vibrometers which use laser beams in the infrared range, in particular at a wavelength of 1550 nm, are known.

A disadvantage here is that the user has no or only an inadequate visual control over the respective impinged measurement point and an automated finding of a point of incidence of such a laser is only possible with additional technical effort. Moreover, in the case of the method according to the invention, an impingement of an alignment point by the measurement beam would not be controllable by the user, or at least would not be controllable in a simple manner. In particular, in this case the user cannot select an alignment point by simple visual inspection by virtue of impinging the desired alignment point with the measurement beam by manually transmitting control commands to the beam directing unit.

Therefore, an additional aiming laser beam from an aiming laser beam source is used to carry out the alignment in an advantageous embodiment of the method according to the invention. The aiming laser beam is preferably coupled into the beam path of the beam directing unit in such a way that the aiming laser beam is incident at the same location of the measurement object as the measurement beam. In particular, the aiming laser beam is preferably coupled coaxially to the measurement beam into the beam path of the beam directing unit, and so the measurement and aiming laser beam are deflected in identical fashion by the beam directing unit.

In this advantageous embodiment, the aiming laser beam source thus represents the laser beam source and the aiming laser beam represents the laser beam for the method according to the invention or a preferred embodiment thereof. In particular, in method step C, the aiming laser beam is directed at at least three spatially different alignment points.

Moreover, it is not necessary for the measurement beam to be transmitted at the same time for the purposes of carrying out the alignment since no interferometric measurement needs to take place during the alignment and hence the laser beam source for the measurement beam can be switched off in this case.

However, it is advantageous to leave the measurement laser beam switched on during the alignment, since an automatic focusing of the measurement laser beam can advantageously be realized by evaluating the interferometric signal strength. An advantageous embodiment of an optical unit for the laser beam of the measurement apparatus is that the aiming laser beam is focused as soon as the measurement laser beam is focused. This means that the aiming laser can also be automatically focused via automatic focusing of the measurement laser.

Accordingly, in a preferred embodiment, the measurement apparatus has an aiming laser beam source for an aiming laser beam, and the controller is embodied to carry out an alignment of the beam directing unit by the aiming laser beam as a laser beam.

The laser beam from the laser beam source is directed at a plurality of measurement points on a measurement object in the present case using a beam directing unit. This can be embodied in a manner known per se. Thus, the scope of the invention includes the beam directing unit being embodied as a deflection unit and the laser beam being deflected by one or more movable mirrors or other optical means. Likewise, the laser beam can also be directed at a desired point by a translational displacement of an optical element, for example by linear movement of a mirror by an electric motor. Likewise, the scope of the invention includes moving the laser beam source, in particular the entire measurement apparatus, by the beam directing unit. Thus, the beam directing unit can be embodied as a movement unit, for example to move the measurement apparatus in translational fashion, for example in an x-direction and a y-direction perpendicular thereto. Likewise, the beam directing unit can alternatively or additionally be embodied for tilting or rotating the laser beam source, in particular the entire measurement apparatus. In particular, the scope of the invention includes the measurement apparatus being able be rotated about one or preferably two axes by the beam directing unit. In particular, the scope of the invention includes the beam directing unit being embodied as a robot arm in order to achieve alignment of the laser beam from the laser beam source with a desired measurement point.

However, the invention is not restricted to the aforementioned beam directing units. What is essential is that control parameters are able to be specified such that, for a measurement point that can be impinged upon by the laser beam, the laser beam of the laser beam source can be directed at the desired measurement point by specifying corresponding control parameters by the beam directing unit.

Other advantageous embodiments of the beam directing unit are also conceivable. The change in the spatial laser beam path can also be brought about using mechanical adjustment units that move the measuring head, the laser, optical units or other parts. Mirror scanners moved by galvanometric principles, mirror scanners with gimbal-mounted mirrors, piezo-scanners, wedge plate scanners or MEMS scanners are particularly advantageous. Electro-optically or acousto-optically operated beam directing units are also conceivable.

Essential aspects of the present invention, at least of advantageous embodiments thereof, can thus be summarized as follows: Spatially resolved images of the measurement surface of a measurement object are recorded using suitable image recording units, with at least one part of the images being used to create a three-dimensional model of the measurement surface and another part of the images, which is not necessarily disjoint, serving to provide alignment point images, these images are then brought into a spatial relationship with the created three-dimensional model of the measurement surface. The alignment points are localized in the alignment point images, i.e. they are manually or automatically assigned locations in the respective associated spatially resolved alignment point image, such that they can then be assigned coordinates in the model of the measurement surface via the spatial relationship between the alignment point images and the three-dimensional model of the measurement object surface. Alternatively, the alignment points can also be localized in the three-dimensional model of the measurement surface. The laser beam is directed at at least three spatially different alignment points, and the associated control parameters of the beam directing unit are ascertained. Both the three-dimensional coordinates in the model of the measurement surface and the associated control parameters are therefore available for the alignment points. An assignment rule is then ascertained therefrom, with the aid of which the corresponding control parameters of the beam directing unit are assigned to any measurement point on the measurement surface that can be impinged upon by the laser beam. To this end, use is particularly advantageously made of a beam directing unit model which models the laser beam path relative to the beam directing unit on the basis of the control parameters and, where necessary, additionally on the basis of further parameters that are initially undetermined. In this case, in addition to the assignment rule, it is also possible to determine the respective associated beam direction of the laser beam when it is incident on the measurement point in the coordinate system of the measurement object. Since measuring systems based on interferometry always only ascertain the vibration in the direction of the measurement laser beam for vibrations or in the direction of an angle bisector between the measurement beam running to the object and returning from the object, as described above, this is of particular importance for applications in vibrometry. In particular when using a plurality of measurement apparatuses, preferably three or more, this then provides the option of separately ascertaining vibration information about the measurement object in all three spatial dimensions and, where necessary, specifying this relative to the measurement surface or in coordinates of the measurement object model. The laser beam can be directed at the alignment points either before, after or during the recording of the alignment point images; this can also be handled in different ways for different alignment points.

It is particularly advantageous to capture the alignment point images by an image recording unit that is fixed relative to the beam directing unit, said image recording unit being particularly preferably located in the vicinity of the laser exit opening of the laser beam and therefore imaging the measurement object approximately from the perspective of the beam directing unit. Since the images of this image recording unit are spatially related to the created three-dimensional model of the measurement surface, the associated coordinates of the corresponding measurement point in the coordinate system of the measurement object can be assigned immediately to each picture element in the spatially resolved images of this image recording unit. Any point on the measurement surface that is visible through this image recording unit and, at the same time, able to be reached by the laser beam can then be used as the alignment point.

In contrast to the procedure according to the known prior art, this also allows the use of alignment points that are not recognizable on account of their texture, color, position, etc. and can therefore only be assigned with difficulty to the corresponding points in the measurement object model; this is a considerable advantage, especially for surfaces with little structure.

It is also advantageous to record the alignment point images while the laser beam is directed at the alignment points. This makes it possible in a particularly accurate manner to localize the alignment point in the alignment point image, independently of whether this is done automatically or manually.

It is particularly advantageous if a subset of those images of the measurement surface that are also used to create the three-dimensional model of the measurement surface are used as alignment point images, since the images of this subset have a particularly precise relationship with the three-dimensional model of the measurement surface. It is very particularly advantageous if these alignment point images are then recorded when the laser beam is directed at the respective alignment point because the localization of the alignment points in the respective associated alignment point image then also has the highest accuracy. In order to accomplish this in a simple manner, the beam directing unit can direct the laser beam at a plurality of alignment points in succession while recording the alignment point images. This can be brought about by virtue of an automated switchover taking place, preferably in such a way that precisely the alignment point for which an alignment point image is to be recorded at the same time is illuminated in each case. However, this can also be implemented in semi-automatic fashion, for example by a switchover being initiated manually each time alignment point images have been successfully recorded. Or this can also be implemented completely in manual fashion by manually switching to the respective alignment point and then recording the alignment point images accordingly. If the alignment point images are recorded when the laser beam is directed at the alignment point and the same alignment point images are used to create the three-dimensional model, coordinates in the three-dimensional measurement object model can be assigned to the alignment points in a particularly simple manner. The alignment points can then also be identified directly in the measurement object model, be it automatically or manually, and their coordinates can be saved for later use or stored in the memory of the controller.

BRIEF DESCRIPTION OF THE DRAWINGS

Further advantageous features and preferred embodiments are described below on the basis of the figures and exemplary embodiments. In this case:

FIG. 5 shows views of the measurement object and a spatially resolved image for explaining the determination of the position of an image recording unit; and FIG. 6 shows views of the measurement object and a spatially resolved image for explaining the determination of 3D coordinates for a picture element of the spatially resolved image.

DETAILED DESCRIPTION

The figures show schematic representations that are not true to scale. In the figures, the same reference signs denote elements that are the same or have the same effect.

Figure 1:
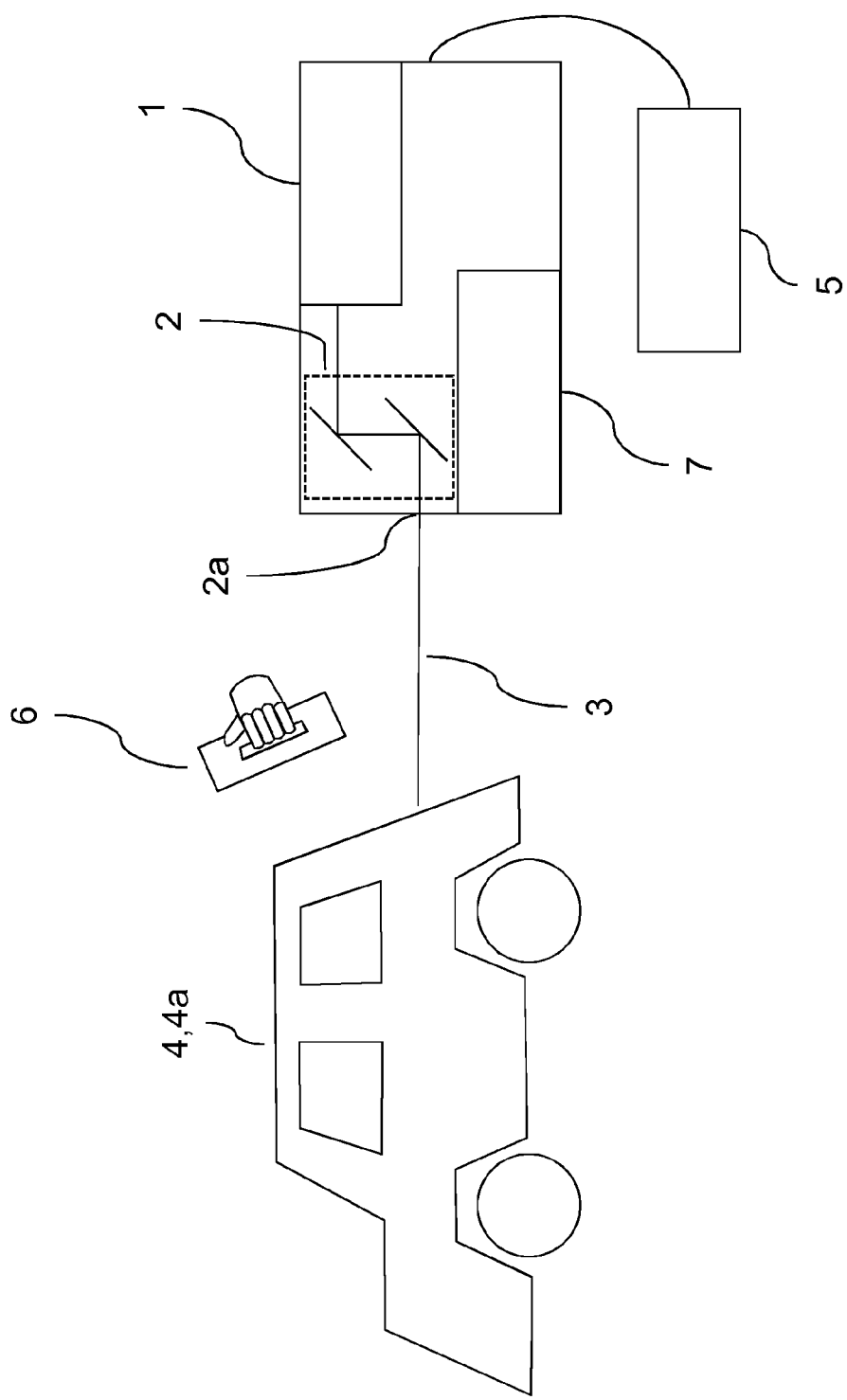
FIG. 1 shows a first exemplary embodiment of a measurement apparatus according to the invention.

The first exemplary embodiment of a measurement apparatus according to the invention for carrying out an interferometric measurement according to FIG. 1 comprises a vibrometer 1 and a beam directing unit 2.

The vibrometer 1 is embodied in a manner known per se as an optical interferometer, comprising a laser as the beam source for generating an original beam, comprising at least one beam splitter for splitting the original beam into at least one measurement and at least one reference beam and for superimposing the reference beam with the measurement beam, which was reflected and/or scattered by the measurement object, on the detector to form an optical interference. In this exemplary embodiment, the laser beam has a wavelength of 632.8 nm.

The vibrometer can be embodied as described in DE 10 2012 211 549 B3.

In the present case, the beam directing unit 2 is embodied as a deflection unit and has two mirrors that are rotatable by galvanometers such that a mirror scanner is embodied for two-dimensional deflection in a manner known per se. For reasons of clarity, two mirrors of the beam directing unit 2 are shown schematically. Consequently, a laser beam, as a measurement beam 3, is directed at a plurality of spatially different measurement points by the beam directing unit 2.

The measurement beam 3 of the vibrometer 1 passes through the beam directing unit 2 and is incident on a measurement surface of a measurement object. By the beam directing unit 2, the measurement beam 3 can be directed at a back region of an automobile and at floor and wall areas surrounding the automobile. Consequently, the measurement object 4 comprises the automobile 4a as the measurement article and also wall and floor areas. In the present case, the measurement surface is the area that is able to be impinged upon by the measurement beam 3 and thus comprises the surface of the automobile 4a in a back region and also wall and floor areas.

The object of the interferometric measurement is to carry out vibration measurements for a plurality of measurement points on the surface of the automobile 4a in the back region with the engine of the automobile 4a running.

To this end, the measurement apparatus also has a controller 5 which is connected to the vibrometer 1 and the beam directing unit 2. Control parameters are transmitted to the beam directing unit 2 by the controller 5 in order to obtain a desired mirror position. The controller 5 also controls the laser beam source of the vibrometer 1 and evaluates the measurement signals from the detector of the vibrometer 1 in order to ascertain vibration data from the optical interference between the measurement and reference beams.

The measurement apparatus furthermore comprises an image recording unit 6 that is movable relative to the beam directing unit. It is designed as a hand-held device and is therefore shown with a stylized hand.

The movable image recording unit 6 is embodied to carry out a stripe projection and therefore has a camera for capturing spatially resolved images and a projection unit for projecting stripe patterns. The movable image recording unit 6 is also connected to the controller 5, in wireless fashion or via a connecting cable, in order to transmit data of the spatially resolved images to the controller 5.

The measurement apparatus furthermore comprises an image recording unit 7 which is fixed relative to the beam directing unit 2, embodied as a CCD or CMOS camera and arranged in a common housing with the vibrometer 1 and the beam directing unit 2. The fixed image recording unit 7 is arranged, where necessary with deflecting mirrors and/or superimposed-beam splitters (e.g. color beam splitters such as dichroic elements, etc.), in such a way that a spatially resolved image of the automobile 4a can be captured, approximately from the perspective of a beam exit 2a of the beam directing unit at which the measurement beam 3 exits.

The controller 5 is embodied to carry out an alignment of the beam directing unit by the controller in order to assign corresponding control parameters for the beam directing unit 2 to a measurement point on the measurement surface that can be impinged upon by the measurement beam. Furthermore, the controller 5 is embodied to create a three-dimensional model of at least the back region of the automobile 4a that is able to be impinged upon by the measurement beam 3 by the beam directing unit 2, on the basis of a plurality of spatially resolved images that are captured by the movable image recording unit 6.

Three exemplary embodiments of a method according to the invention which can be carried out by a measurement apparatus according to the first exemplary embodiment are described below. The object of the method is to carry out an alignment of the beam directing unit 2.

Exemplary Embodiment 1 of a Method According to the Invention:

In a method step A, a plurality of spatially resolved images of the back area of the automobile 4a are recorded by the movable image recording unit 6. To this end, the user moves the movable image recording unit 6 around the back region of the automobile 4a, while a multiplicity of spatially resolved images are recorded automatically. As described above, the movable image recording unit 6 generates stripe patterns according to the principle of stripe projection during the recording of the plurality of spatially resolved images such that, in manner known per se, a three-dimensional model is created photogrammetrically by the controller 5 in a method step B, said model at least comprising the back region of the automobile 4a. The three-dimensional model has a polygon mesh of triangles, which reproduces the geometric shape of this region.

Alternatively, the image recording unit 6 is embodied as a commercially available camera or a combination of an illumination unit and one or more cameras. Both black-and-white and color cameras can be used. Particularly preferably, in addition to the information required to determine the geometry of the measurement surface, the image recording unit also records information relating to the texture and/or color of the surface, very preferably by comprising a color camera, for example. The recording of texture and/or color information and its spatial association with the recorded images or the topographical 3D model of the object is particularly advantageous because, as described above, this allows the different recorded images to be associated with one another much better and the location of the recording of the respective camera image can also be assigned much more precisely relative to the 3D model.

A spatially resolved image of the back region of the automobile 4a is likewise captured by the fixed image recording unit 7 and transmitted to the controller 5. Only one alignment point image is therefore used in this exemplary embodiment.

On the basis of this data, each picture element of the spatially resolved image of the image recording unit 7 can be assigned spatial coordinates in the three-dimensional model of the automobile 4a by determining the location of the fixed image recording unit 7 as follows:

In this exemplary embodiment, the spatial coordinates of the fixed image recording unit 7 are ascertained in the three-dimensional model. This is done by creating a plurality of virtual views of the back region of the automobile 4a from different viewing points on the basis of the three-dimensional model. A corresponding or at least closest virtual view can be determined by comparing the virtually created views with the image captured by the fixed image recording unit 7. The location of this virtual view thus corresponds at least approximately to the actual location of the fixed image recording unit 7 in the coordinate system of the three-dimensional model. By way of example, x-, y-, z-coordinates can be determined for the location of the fixed image recording unit 7 in the three-dimensional model of the automobile 4a. This is further explained in more detail in FIG. 5 and the description of the figures.

On the basis of the three-dimensional model and the determined spatial coordinates of the fixed image recording unit 7, each picture element of a spatially resolved image of the fixed image recording unit 7 can also be assigned spatial coordinates in the three-dimensional model—at least for those picture elements which show a point on the surface of the automobile 4a. The underlying principle has already been explained in connection with the general description of method step B and is explained in more detail below in relation to FIG. 6.

Subsequently, in a method step C, the measurement beam 3 is directed by the beam directing unit 2 at four or more spatially different alignment points on the automobile 4a. The selection is made manually by the user: Using an input unit such as a keyboard and/or mouse, the user controls the beam directing unit 2 via the controller 5 in order to direct the measurement beam 3 to a desired alignment point. If the measurement beam 3 is incident on a desired alignment point, the user confirms this via the controller 5.

The controller 5 assigns the present control parameters (for example an angular position for each of the two mirrors of the beam directing unit 2) to this alignment point. Likewise, the controller 5 controls the fixed image recording unit 7 in order to capture a spatially resolved alignment point image in a method step D.

This procedure is repeated for all four alignment points such that, firstly, the corresponding control parameters for the beam directing unit 2 and, secondly, a spatially resolved alignment point image are available for each alignment point, the alignment point in each case including the alignment point impinged upon by the laser beam.

The alignment point is now respectively localized in the alignment point images by the controller 5. In the present case, this is implemented by finding the image regions with the greatest light intensity since the point impinged upon by the laser beam in the spatially resolved image of the fixed image recording unit 7 has a significantly higher light intensity in comparison with the other image regions in the present measurement situation.

After the alignment point has been localized in the alignment point images, each alignment point is assigned—as described above—spatial coordinates in the three-dimensional model in a method step E, for example in the form of x-, y-, z-coordinates.

There are now consequently spatial coordinates in the three-dimensional model and corresponding control parameters of the beam directing unit 2 for each alignment point. Based on the method described above or the method described in Yanchu Xu, R. N. Miles, loc. cit., or WO 93/15386, an assignment rule is now determined on the basis of the specified spatial coordinates and control parameters of the alignment points. Using the assignment rule, control parameters for the beam directing unit 2 can be determined for any desired measurement point on the automobile 4a that is able to be impinged upon by the measurement beam, in order to direct the measurement beam 3 at this desired measurement point. Moreover, the angle of incidence of the measurement beam or its beam path when incident on the measurement object can also be specified.

To avoid repetition, only the essential differences to the first embodiment are discussed in the two exemplary embodiments of a method according to the invention described below:

Exemplary Embodiment 2 of a Method According to the Invention:

The second exemplary embodiment of a method according to the invention facilitates greater accuracy in determining the spatial coordinates of the alignment points by the alignment point images and the three-dimensional model. Investigations by the applicant have shown that, in the case of some surfaces of a measurement article, an assignment of spatial coordinates to picture elements of a spatially resolved image of the fixed image recording unit 7 is afflicted by errors. One reason for this is the lack of optically distinctive structures which allow the image of the fixed image recording unit 7 to be compared with the three-dimensional model. Deviations in the assignment of spatial coordinates in the three-dimensional model to picture elements of the spatially resolved image of the fixed image recording unit 7 can result, particularly in the case of surfaces that have only slight differences in height, have no pronounced edges and/or have no color differences.

The method according to the second exemplary embodiment therefore already provides, in method step A, for at least one point, preferably more, on the measurement object 4, in this case on the measurement article, the automobile 4a, to be impinged upon by a laser beam, in this case with the measurement beam 3, by way of the beam directing unit 2, when recording the plurality of spatially resolved images by the movable image recording unit 6.

In the present second exemplary embodiment, this is implemented by the user first selecting the four alignment points and the measurement beam 3 being directed at each of the four alignment points in a repeated sequence, in this case each with a dwell time of 1 second per alignment point, when carrying out method step A by the beam directing unit 2. Longer or shorter dwell times can also be used.

While the user of the movable image recording unit 6 is recording the spatially resolved images of the back region of the automobile 4a, an alignment point is consequently also captured for at least some spatially resolved images. On account of the repeated sequence with which the alignment points are impinged upon by the measurement beam 3, each alignment point will still be captured at least in a spatially resolved image.

While the plurality of spatially resolved images are being recorded according to method step A in an advantageous development, there can be, at the same time, a localization of points impinged upon by the measurement beam 3 by the controller 5 and a signal, in particular an optical and/or acoustic signal, can be output to the user as soon as each point impinged upon by the measurement beam 3 is captured at least in one spatially resolved image.

To ascertain the spatial coordinates of the fixed image recording unit 7 in the three-dimensional model, an alignment point image, in which the respective alignment point is impinged upon by the measurement beam 3, is first recorded for each alignment point in this second exemplary embodiment. This is possible in an automated manner, since the associated control parameters were already specified by the user when carrying out method step A and can therefore now be used for the automated directing of the measurement beam 3 at the respective adjustment point.

As a result thereof, there is a precise assignment of location coordinates in the spatially resolved image of the fixed image recording unit 7, even if problematic measurement surfaces with no or only a few significant optical structures are present. Subsequently, as already described in the case of the first exemplary embodiment, spatial coordinates are assigned to each alignment point on the basis of the alignment point images in accordance with method step E, and finally an alignment in accordance with method step F is carried out.

In an alternative embodiment of the second exemplary embodiment, random points that need not necessarily coincide with the alignment points are impinged upon by the measurement beam 3 in method step A. This also creates an additional optical structure by impinging upon the measurement surface of the measurement beam 3. A spatially resolved image is likewise recorded by the fixed image recording unit 7 for each of these random points to create an optical structure. In a manner that is economical in terms of method, this can be implemented at the same time as method step A is carried out, and so method step D and method step A are carried out at the same time. In this case it is therefore not necessary to save the control parameters of these randomly selected locations in order to create an additional optical structure. However, the information available is advantageously also used for the alignment. Since each of the randomly selected locations for creating an additional optical structure is contained in at least one spatially resolved image of the movable image recording unit 6 and in at least one image of the fixed image recording unit 7, a precise determination of the position of the fixed image recording unit 7 can be made—as already described in the first exemplary embodiment—by spatial coordinates in the three-dimensional model. In this modification, the alignment points are then impinged upon by the measurement beam 3 as described in the first embodiment and a spatially resolved alignment point image is recorded by the fixed image recording unit 7 for each alignment point in order to assign spatial coordinates in the three-dimensional model to each alignment point according to method step E.

Exemplary Embodiment 3 of a Method According to the Invention:

The third exemplary embodiment of a method according to the invention largely corresponds to the second exemplary embodiment, but differs from the two preceding exemplary embodiments in that it does not require the use of the fixed image recording unit 7:

The third exemplary embodiment provides for method step D to be integrated into method step A. As also described in the case of the first variant of the second exemplary embodiment, the alignment points are impinged upon by the measurement beam 3 in method step A while the plurality of spatially resolved images are being recorded by the movable image recording unit 6. In contrast to the two preceding methods, however, at least one spatially resolved image of the movable image recording unit 6, which contains the alignment point, is used as the alignment point image for each alignment point. There is therefore no separate recording of alignment point images by the fixed image recording unit 7, but rather the capture of these alignment point images is integrated in method step A.

When the three-dimensional model is created according to method step D, the alignment points impinged upon by the measurement beam 3 are additionally localized, and spatial coordinates in the three-dimensional model are assigned to each alignment point. To this end, the respective alignment point is localized in the images of the texture of the measurement object. The triangle of the three-dimensional object which, projected onto the texture coordinates, contains the alignment point is determined. The parameters of a bilinear interpolation of the texture coordinates of the alignment point from the texture coordinates of the vertices of the triangle are determined. These parameters are used to interpolate the 3D coordinates of the vertices of the triangle of the polygon mesh of the three-dimensional model and ultimately the spatial coordinates of the alignment point in the three-dimensional model are determined therefrom.

In the third exemplary embodiment, too, there are therefore spatial coordinates in the three-dimensional model and control parameters for each alignment point. The assignment of the control parameters to the corresponding alignment point takes place in this third exemplary embodiment as described below:

In contrast to the procedure according to the second exemplary embodiment, the user first selects a first alignment point manually when carrying out method step A by using control commands to control the beam directing unit 2 in such a way that the measurement beam 3 impinges on the desired alignment point. Subsequently, the user uses the movable image recording unit 6 to record at least one spatially resolved image which comprises the alignment point. Here, too, the alignment point impinged upon by the measurement beam 3 can advantageously be localized by the controller 5 while this image or these images are captured, and so the user can be informed by a signal, in particular an acoustic or optical signal, that the corresponding alignment point has been captured. As a result, the control parameters corresponding to this alignment point are therefore also unambiguously assigned. This procedure is carried out for all alignment points such that there is an unambiguous assignment of the alignment point and corresponding control parameters.

As already described in the previous exemplary embodiments, the alignment is carried out on the basis of the spatial coordinates of the alignment points and the corresponding assigned control parameters according to method step F.

In an alternative embodiment of the exemplary embodiment 3, the beam directing unit 2 is configured as a mechanical displacement unit instead of with two rotating mirrors. In particular, a vibrometer can be embodied with a plurality of measurement beams, in such a way that these meet at one point and are moved together by the beam directing unit. The object of the alignment is also the same in this embodiment, namely to find control parameters for the beam directing unit starting from any object coordinates such that the laser beams meet at the associated points on the object surface.

Figure 2:
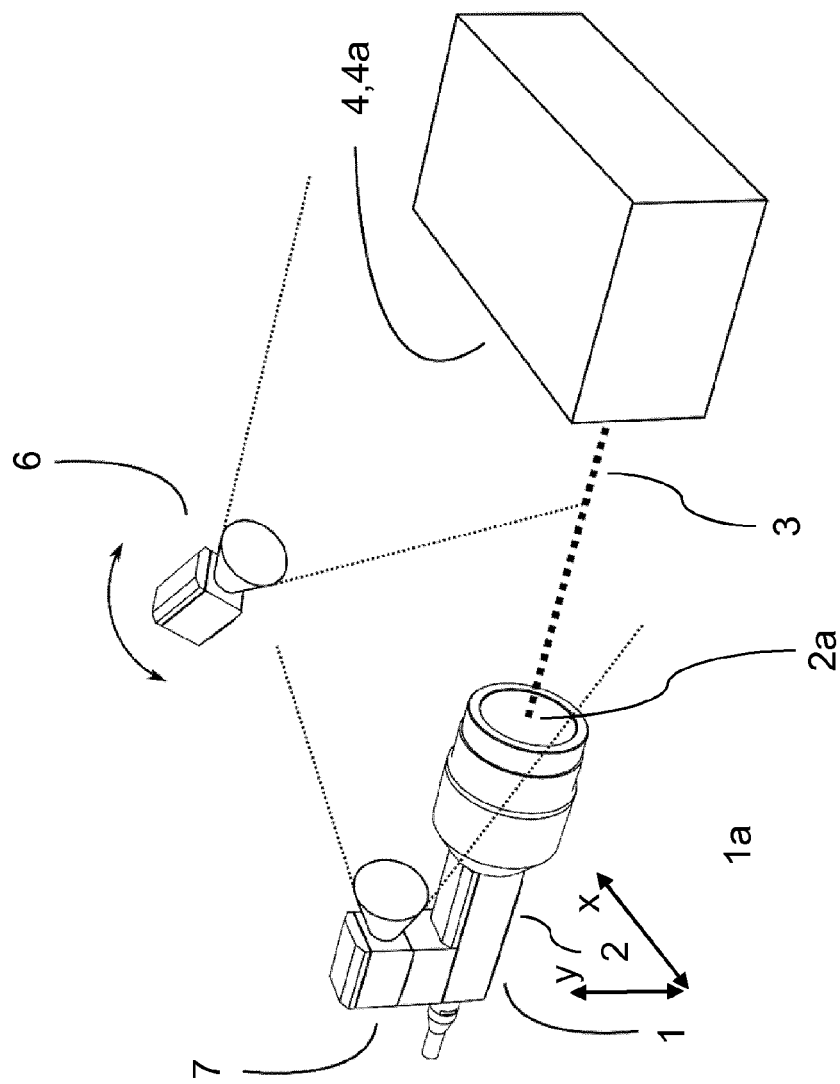
FIG. 2 shows a second exemplary embodiment of a measurement apparatus according to the invention.

FIG. 2 illustrates a second exemplary embodiment of a measurement apparatus according to the invention in order to clarify the spatial arrangement of the individual elements:

The individual elements have the same or an analogous structure to the first exemplary embodiment, which is why only the differences are discussed below:

In the schematically illustrated measurement object 4, the cuboid measurement article 4a should be measured at a plurality of measurement points on a side facing the vibrometer 1. The spatially resolved images are recorded according to method step A by the movable image recording unit 6. The vibrometer 1 comprises an image recording unit 7 arranged in fixed fashion on the vibrometer 1 and a focusing device 1a. The measurement beam 3 is focused on the respective measurement point on the surface of the measurement article 4a by the focusing device 1a. The measurement apparatus according to the second exemplary embodiment has an xy-stage as the beam directing unit 2, and so the vibrometer 1 can be moved in two dimensions x and y relative to the measurement article 4a. In the present case, the beam directing unit 2 does not deflect the measurement beam 3 relative to the vibrometer 1; instead, there is a displacement of the entire unit in the x- and/or y-direction.

The alignment method is carried out analogously to the alignment method described initially in FIG. 1.

Figure 3:
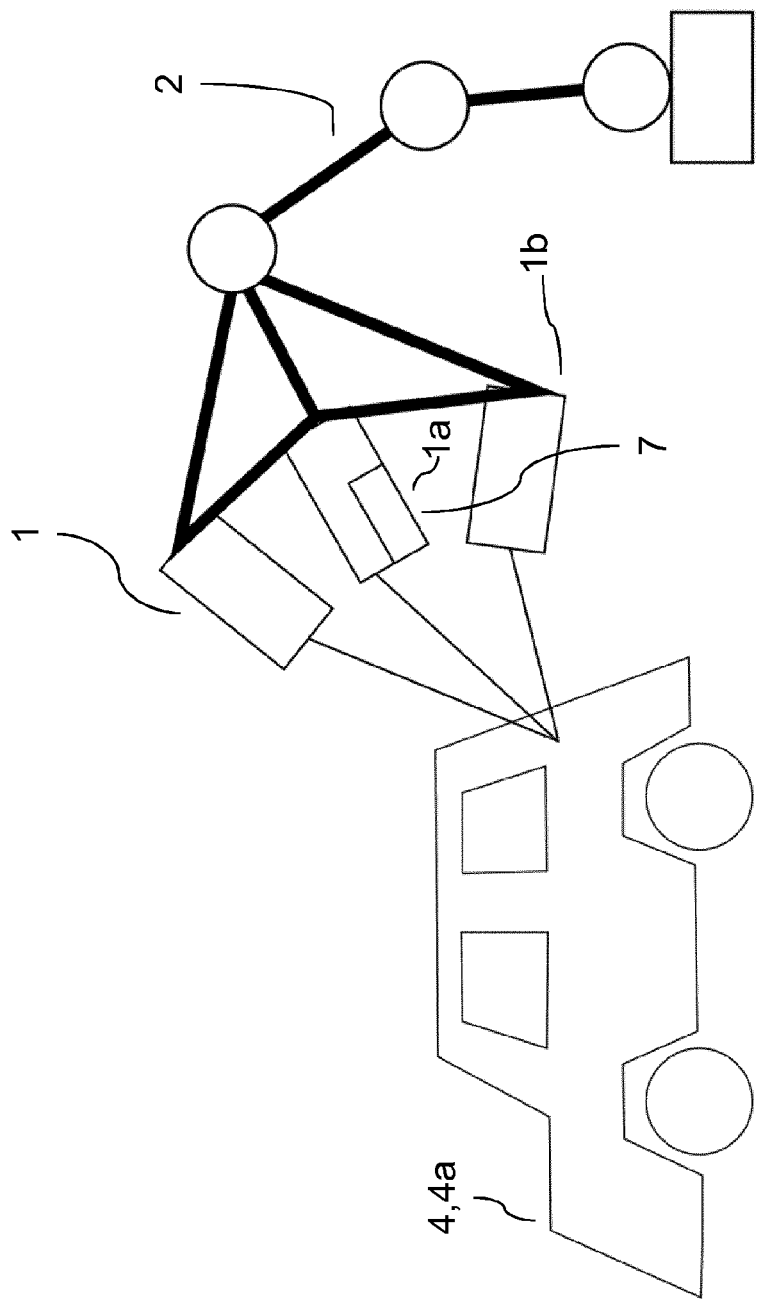
FIG. 3 shows a third exemplary embodiment of a measurement apparatus according to the invention.

FIG. 3 illustrates a third exemplary embodiment of a method according to the invention.

In contrast to the first exemplary embodiment according to FIG. 1, this has three vibrometers 1, 1a and 1b, which are arranged on a common robot arm. The robot arm thus forms the beam directing unit 2, by which the vibrometers 1, 1a and 1b can be moved relative to the measurement article 4a. In the case of the vibrometers 1, 1a and 1b, only the vibrometer 1a has a fixed image recording unit 7. The vibrometers 1, 1a and 1b are arranged in fixed fashion with respect to one another on the beam directing unit 2, and so the image recording unit 7 is likewise fixed with respect to vibrometer 1 and 1b.

For the measurement apparatus according to the third exemplary embodiment, an alignment according to exemplary embodiment 1 of a method according to the invention is carried out as described in FIG. 1, which alignment does not require an additional fixed image recording unit in the vibrometers 1 and 1b. The alignment is carried out for all three vibrometers, method steps A and B only having to be carried out once.

Figure 4:
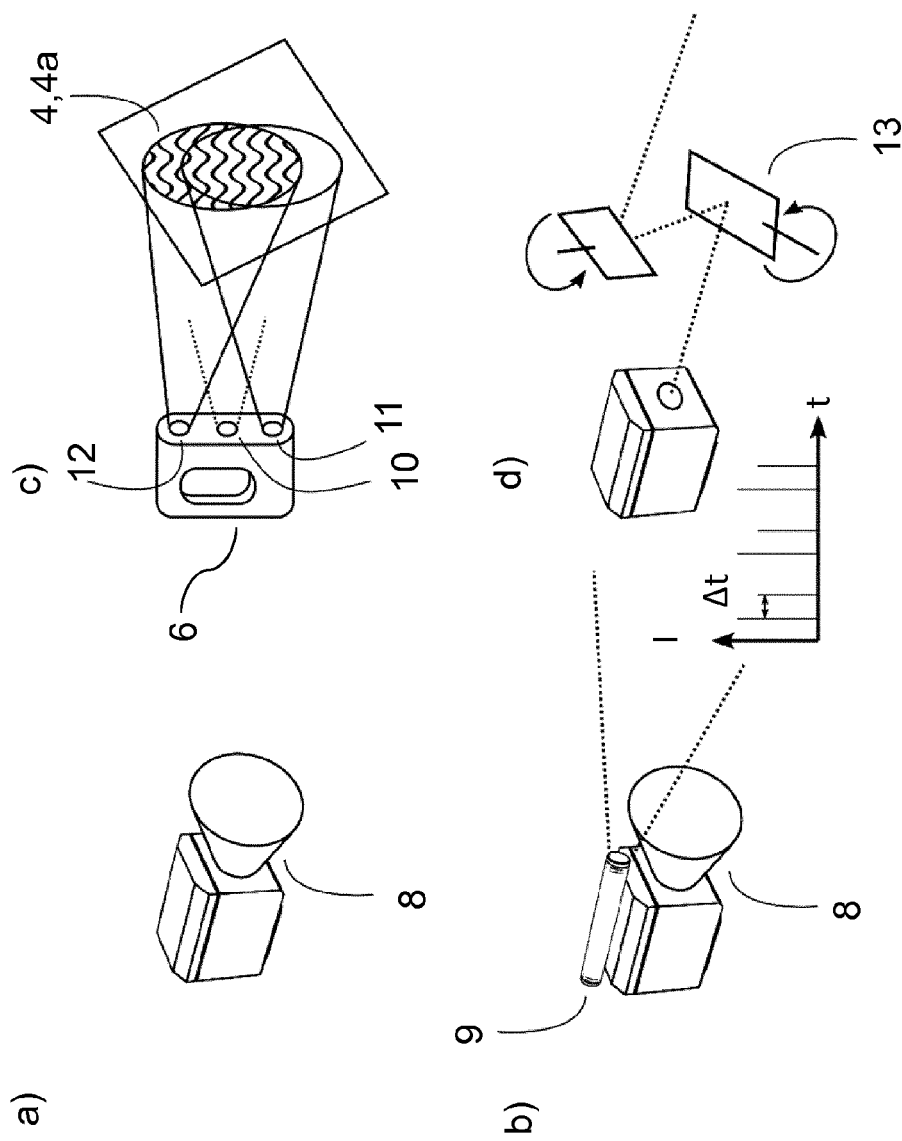
FIG. 4 shows exemplary embodiments of image recording units.

FIG. 4 schematically illustrates exemplary embodiments of image recording units for exemplary embodiments of the measurement apparatus according to the invention and for use in exemplary embodiments of the method according to the invention:

The image recording unit a) is embodied as a commercially available digital camera, known per se, with a lens 8. The image recording unit according to b) additionally has a range finder 9.

In an alternative embodiment, the element provided with reference sign 9 is embodied as an illumination unit for illuminating the measurement object with pulsed and/or modulated light. An evaluation unit evaluates the time of flight (in the case of pulsed light) and/or a phase shift (in the case of modulated light) between the light emitted by the illumination unit 9 and the light received by the digital camera in order to determine the distance in a manner known per se, in particular according to the "time-of-flight" method.

As a matter of principle, these two cameras can be used both as a movable image recording unit 6 and as a fixed image recording unit 7.

The image recording unit c) is particularly suitable as a movable image recording unit 6:

The image recording unit according to c) comprises a color camera 10, a black-and-white camera 11 and a stripe projection unit 12. A stripe pattern is projected onto the measurement object 4 and, in particular, the measurement article 4a by the stripe projection unit 12. A spatially resolved image is recorded by the black-and-white camera 11. Subsequently, the stripe projection unit 12 and the black-and-white camera 11 are switched off and a spatially resolved color image is recorded by the color camera 10. This process is repeated in quick succession. The user guides the movable image recording unit 6, which is designed as a hand-held appliance, around the measurement article 4a such that a plurality of spatially resolved images are recorded both by the black-and-white camera 11 and by the color camera 10. A three-dimensional model of the measurement object 4 can be created from the images of the black-and-white camera using the stripe projection method known per se. Moreover, the individual surfaces of the three-dimensional model, in particular surfaces of a polygon mesh of the three-dimensional model, can be assigned image components of the color images recorded by the color camera 10, and so it is not only a three-dimensional model that is present but, moreover, a color image of the associated surface for each polygon.

The image recording unit d) has only one beam which can be directed at points on the surface of the measurement object by two rotatable mirrors of a deflection unit 13 of the image recording unit d). The image recording unit d) is embodied as a time-of-flight unit: In a scanning method, the measurement beam of the image recording unit d) is directed at a multiplicity of locations on the object. A light pulse is emitted for each location and the time within which the light spot reflected by the object arrives at the image recording unit d) again is measured. In a manner known per se, the distance to the object can be determined, at least qualitatively, from the time difference between the emission of the light pulse and the return of the light pulse. A three-dimensional model of the object can be created from a comparison of the times required in each case for the plurality of measurement points. The image recording unit d) is therefore suitable for carrying out method steps A and B.

In this case, too, a spatially resolved image is initially recorded by the aforementioned scanning method without moving the image recording unit d) relative to the measurement object. The image recording unit d) is subsequently moved relative to the measurement object in order to record a further spatially resolved image from a different perspective, likewise by the scanning method. By repeating these processes, a plurality of spatially resolved images are recorded from different perspectives, according to method step A.

FIG. 5 shows schematically a projected view of the measurement object 4 on the basis of the measurement object model and, above it, a stylized two-dimensional, spatially resolved image 4' of the measurement object, which was recorded with an image recording unit. As already described above, projected views of the measurement object are preferably compared with the spatially resolved image in order to find the position, direction and preferably also imaging parameters of the image recording unit. The comparison is preferably carried out using identified features of the texture of the measurement object, as indicated schematically in FIG. 5 by a cross, circle and square on the measurement article 4a. These features can also be found in the spatially resolved image 4'. As described above, the position, direction and preferably imaging parameters of the camera are determined in such a way that the projected view matches or at least approximately matches the spatially resolved image. This determines the position and alignment of the image recording unit in the measurement object model. As a result, it is then also possible, as described above, to assign the associated 3D coordinates in the three-dimensional measurement object model to each location in images recorded with the aid of the image recording unit.

FIG. 6 schematically shows a view of the measurement object 4 with a laser beam point of incidence, labeled by a point, approximately in the center of the measurement article 4*a*. Above this, a spatially resolved image 4', which was recorded with an image recording unit, is illustrated schematically. The image 4' also comprises the laser beam point of incidence. As described above, by mapping coordinates of the measurement object model to the picture elements of image 4' and by locating the laser beam point of incidence in the image 4', the laser beam point of incidence can be assigned a position in the measurement object model, in particular coordinates in the coordinate system of the measurement object model, in particular by virtue of the position of the laser beam point of incidence initially being located in the camera image and then the points of the geometry model whose projection on the camera image is very close to the alignment point in the camera image being sought after. By interpolating the 3D coordinates of these points of the geometry model, the 3D coordinates of the alignment point can finally be determined.

LIST OF REFERENCE SIGNS

1, 1*a*, 1*b* Vibrometer
2 Beam directing unit
2*a* Beam exit
3 Measurement beam
4, 4*a* Measurement object
5 Controller
6 Moveable image recording unit
7 Fixed image recording unit
8 Lens
9 Range finder
10 Color camera
11 Black-and-white camera
12 Stripe projection unit
13 Deflection unit

The invention claimed is:

1. An alignment method for a beam directing unit (2) of an interferometric measurement apparatus for directing a laser beam from a laser beam source at a plurality of measurement points of a measurement object (4),
the method comprising:
A) recording a plurality of spatially resolved images of a measurement surface of the measurement object (4) from different perspectives;
B) creating a three-dimensional model of at least the measurement surface of the measurement object (4) by the plurality of spatially resolved images of the measurement surface;
C) directing the laser beam at at least three spatially different alignment points on the measurement surface by the beam directing unit (2) by specifying control parameters of the beam directing unit (2) for each said alignment point;
D) capturing one or more spatially resolved alignment point images such that each said alignment point is captured in at least one of the alignment point images;
E) assigning spatial coordinates of the three-dimensional model to each of the at least three alignment points by at least one of the alignment point images and the three-dimensional model or the spatially resolved images on which the three-dimensional model is based;
F) carrying out an alignment of the beam directing unit (2) by determining an assignment rule based on the spatial coordinates of the alignment points and the respectively assigned control parameters, in order to use the assignment rule to assign corresponding control parameters for the beam directing unit (2) to a measurement point on the measurement surface that is able to be impinged upon by the laser beam.

2. The method as claimed in claim 1, wherein, in method step D, at least one alignment point image is captured for at least one alignment point, while the laser beam impinges on the alignment point, and the beam directing unit moves the laser beam onto different points of the measurement object when capturing the alignment point images.

3. The method as claimed in claim 1, wherein, in method step E, the assignment of spatial coordinates of the three-dimensional model to each of the at least three alignment points is implemented by localizing locations of the respective alignment points in respectively at least one of the associated spatially resolved alignment point images or in the three-dimensional model of the measurement surface.

4. The method as claimed in claim 1, wherein, in method step F, the respective beam direction with which the laser beam is incident at the respective measurement point on the measurement surface is additionally determined using a suitable modeling or parameterization of an effect of the beam directing unit on the laser beam path.

5. The method as claimed in claim 1, wherein, in method step D, at least two of the alignment point images are captured from different perspectives for each alignment point.

6. The method as claimed in claim 1, wherein a plurality of the alignment point images are recorded, which are captured from a same location and with a same perspective relative to the measurement object (4), and
the alignment point images are captured by an image recorder (7) which is fixedly arranged relative to the beam directing unit (2).

7. The method as claimed in claim 6, further comprising assigning spatial coordinates of the three-dimensional model to picture elements of at least one of the alignment point images using the alignment point images and the three-dimensional model.

8. The method as claimed in claim 1, wherein, in method step C, the at least three alignment points are specified on the measurement surface and the laser beam is automatically directed at each of the three alignment points by the beam directing unit (2), in order to capture said alignment point image for each said alignment point while the laser beam impinges upon the respective alignment point.

9. The method as claimed in claim 8, wherein the specification is implemented by a selection on a spatially resolved image of the measurement surface captured from the perspective of the alignment point image or images.

10. The method as claimed in claim 1, wherein, before method step A, at least three optical alignment point markings are applied to the measurement surface in a method step A0, and in method step E, the assignment of spatial coordinates to the alignment points is implemented by automatic pattern recognition, in that, in method step C, the laser beam is automatically directed at each of the three alignment points by the beam directing unit (2) in order to capture said alignment point image for each said alignment point.

11. The method as claimed in claim 1, wherein at least one of an angle of incidence or a direction of incidence of the laser beam is determined for a specified measurement point on the measurement surface
by at least one of an assignment rule or a beam directing unit model.

12. The method as claimed in claim 1, wherein, in method step B, the three-dimensional model is created using photogrammetry.

13. The method as claimed in claim 1, wherein the laser beam is directed at a predetermined measurement point on the measurement object (4) as a measurement beam (3) by the beam directing unit (2) and the measurement beam (3) that is at least one of reflected or scattered by the measurement object (4) passes through the beam directing unit (2) again and is superimposed with a reference beam to form an optical interference, and
vibration data of the measurement object (4) are calculated by evaluating the optical interference.

14. The method as claimed in claim 1, wherein method steps C, D and F are carried out for a plurality of measuring heads, each of which comprises a laser beam source and one of the beam directing units (2).

15. A measurement apparatus for carrying out an interferometric measurement using laser radiation, the measurement apparatus comprising:
one or more laser beam sources for generating at least one laser beam as a measurement beam and at least one reference beam,
a detector,
an evaluation unit connected to the detector configured to evaluate measurement signals from the detector,
a beam directing unit (2),
the measurement apparatus being configured to direct the measurement beam at a plurality of spatially different measurement points on a measurement object (4) by the beam directing unit and to superimpose the measurement beam, which has been at least partially reflected or scattered by the measurement object, and the reference beam on a detection surface of the detector such that a superimposition or interference signal between measurement beam and reference beam is measurable by the detector,
at least one image recorder (6) configured to record a plurality of spatially resolved images of at least one measurement surface of the measurement object (4) from different perspectives, and
a controller (5) configured to create a three-dimensional model of at least the measurement surface of the measurement object (4) by the plurality of spatially resolved images of the measurement surface and to carry out an alignment of the beam directing unit (2) by the three-dimensional model in order to assign corresponding control parameters for the beam directing unit (2) to a measurement point on the measurement surface that can be impinged upon by the laser beam, and the measurement apparatus is configured to A) record a plurality of spatially resolved images of at least one measurement surface of the measurement object (4) from different perspectives;
B) create a three-dimensional model of at least the measurement surface of the measurement object (4) by the plurality of spatially resolved images of the measurement surface;
C) direct the laser beam at at least three spatially different alignment points on the measurement surface by the beam directing unit (2) by specifying control parameters of the beam directing unit (2) for each alignment point;
D) capture one or more spatially resolved alignment point images such that each said alignment point is captured in at least one alignment point image;
E) assign spatial coordinates of the three-dimensional model to each of the at least three alignment points by at least one of the alignment point images and the three-dimensional model or the spatially resolved images on which the three-dimensional model is based;
F) carry out an alignment of the beam directing unit (2) by determining an assignment rule based on spatial coordinates of the alignment points and the respectively assigned control parameters, in order to use the assignment rule to assign corresponding control parameters for the beam directing unit (2) to a measurement point on the measurement surface that is able to be impinged upon by the laser beam.

16. The measurement apparatus as claimed in claim 15, wherein the at least one image recorder comprises first and second image recorders (6, 7), and the second image recorder (7) is fixed relative to the beam directing unit (2) for capturing at least one spatially resolved image of the measurement surface.

* * * * *